United States Patent
Auernhammer

(10) Patent No.: US 11,561,819 B2
(45) Date of Patent: Jan. 24, 2023

(54) TECHNIQUES FOR ADAPTING ESCALATION PATHS OF INTERRUPTS IN A DATA PROCESSING SYSTEM

(71) Applicant: INTERNATIONAL BUSINESS MACHINES CORPORATION, Armonk, NY (US)

(72) Inventor: Florian Auernhammer, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 17/345,846

(22) Filed: Jun. 11, 2021

(65) Prior Publication Data
US 2022/0398124 A1     Dec. 15, 2022

(51) Int. Cl.
G06F 9/48      (2006.01)
G06F 9/455     (2018.01)
G06F 9/54      (2006.01)
G06F 9/30      (2018.01)

(52) U.S. Cl.
CPC .......... *G06F 9/4812* (2013.01); *G06F 9/3009* (2013.01); *G06F 9/45558* (2013.01); *G06F 9/4856* (2013.01); *G06F 9/542* (2013.01); G06F 2009/45579 (2013.01)

(58) Field of Classification Search
None
See application file for complete search history.

(56) References Cited

U.S. PATENT DOCUMENTS

| | | |
|---|---|---|
| 9,009,377 B2 | 4/2015 | Machnicki et al. |
| 9,378,047 B1 | 6/2016 | Gould et al. |
| 9,678,901 B2 | 6/2017 | Arndt et al. |
| 9,904,638 B2 | 2/2018 | Arndt et al. |
| 10,229,075 B2 | 3/2019 | Arndt et al. |
| 10,423,550 B2 | 9/2019 | Arndt et al. |

(Continued)

OTHER PUBLICATIONS

Smith, S. P9 XIVE Exploitation. Retrieved May 10, 2021, from https://github.com/qemu/skiboot/blob/master/doc/xive.rst.

(Continued)

*Primary Examiner* — Scott C Sun
(74) *Attorney, Agent, or Firm* — Brian F. Russell; Nathan Rau

(57) ABSTRACT

Techniques of adapting an interrupt escalation path are implemented in hardware. An interrupt controller receives, from a physical thread of the processor core, a request to adapt, in an event assignment data structure, an escalation path for a specified event source, where the escalation path includes a pointer to a first event notification descriptor. The interrupt controller reads an entry for the physical thread in an interrupt context data structure to determine a virtual processor thread running on the physical thread. Based on the virtual processor thread determined from the interrupt context data structure, the interrupt controller accesses an entry in a virtual processor data structure to determine a different second event notification descriptor to which escalations are to be routed. The interrupt controller updates the pointer in the event assignment data structure to identify the second event notification descriptor, such that the interrupt escalation path is adapted.

18 Claims, 34 Drawing Sheets

(56) References Cited

U.S. PATENT DOCUMENTS

| | | | |
|---|---|---|---|
| 10,552,351 | B2 | 2/2020 | Auemhammer et al. |
| 10,572,411 | B2 | 2/2020 | Accapadi et al. |
| 10,831,539 | B2 | 11/2020 | Accapadi et al. |
| 10,996,990 | B2 | 5/2021 | Makineedi et al. |
| 2015/0268988 | A1 | 9/2015 | Declercq et al. |
| 2017/0139861 | A1* | 5/2017 | Arndt .................. G06F 13/24 |
| 2020/0167176 | A1 | 5/2020 | Arroyo et al. |
| 2020/0341921 | A1 | 10/2020 | Neiger et al. |
| 2021/0081234 | A1 | 3/2021 | Liu et al. |
| 2021/0089481 | A1 | 3/2021 | Arakji |
| 2021/0096901 | A1 | 4/2021 | Kia et al. |

OTHER PUBLICATIONS

Tu, C. C., Ferdman, M., Lee, C. T., & Chiueh, T. C. (2015). A comprehensive implementation and evaluation of direct interrupt delivery. Acm Sigplan Notices, 50(7), 1-15.

Auernhammer et al.; "XIVE: Externl Interrupt Virtualization For The cloud Infrastructure", Jrd IEEE Journal Of, vol. 32, Issue 4/5, pp. 1-9, July-Sep. 1, 2018.

Sa et al.; "A First Look At RISC-V Virtualization From An Embedded Systems Perspective", Cornell University Library, arXiv:2103 1495v1, pp. 1-11, Mar. 27, 2021.

Jann et al.; "IBM POWER9 System Software", Jrd IEEE Journal Of, vol. 62, Issue 4/5, p. 6:1-6:10, July-Sep. 1, 2018.

Nu et al.; "VT-d Posted Interrupts", Intel Corporation, pp. 1-17, Aug. 26, 2014.

Lee et al.; "Interrupt Handler Migration And Direct Interrupt... Tasks", ACM Transactions On Embedded Computing Systems, vol. 9, No. 4, Article 42, pp. 1-34, Mar. 2010.

* cited by examiner

Event Notification Message (ENM) 302

| Event Target Number | Event Source Number | Event Priority |

(Physical Processor Thread Number)

Prior Art
*Figure 3A*

Notification Rejection Message (NRM) 304

Event Source Number

Prior Art
*Figure 3B*

End of Interrupt (EOI) Message 306

Event Source Number

Prior Art
*Figure 3C*

Event Notification Message (ENM) 1202

| Process ID | Level | Event Target No. | Number of bits to ignore | Escalate Event No. | Event Path No. | Event Priority |

(Virtual Processor Thread No.)

*Figure 12A*

Escalate Message 1204

| Escalate Event No. |

*Figure 12B*

Event Routing Message (ERM) 1206

| Event Path No. | Event Source No. |

*Figure 12C*

Increment Backlog (IB) Message 1224

| Event Path No. |

*Figure 12D*

Redistribute Message 1234

| Event Path No. |

*Figure 12E*

Scan Backlog (SB) Message 1236

| VP # | Operating Priority |

*Figure 12F*

| Saturate | Backlog Count | Link | Addr | Gen | Offset Ctr | Size | Event Priority | Event Target No. | Number of bits to Ignore | Level | Process ID | Escalate Event No. |
|---|---|---|---|---|---|---|---|---|---|---|---|---|
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

Event Notification Descriptor Table (ENDT) 1460
(One Row Per Event Path)

*Figure 14C*

Interrupt Context Table (ICT) 242
(One Row Per Exception Line)

| Rep. Addr. | Valid | VP # | Process ID | Operating Priority | IAC | Escalate Event No. | Assigned | Event Path No. | Event Priority | Preferred | Physical Thread No. |
|---|---|---|---|---|---|---|---|---|---|---|---|
| | | | | | | | | | | | 0 |
| | | | | | | | | | | | 1 |
| | | | | | | | | | | | 2 |
| | | | | | | | | | | | 3 |
| | | | | | | | | | | | 4 |
| | | | | | | | | | | | 5 |
| | | | | | | | | | | | ... |
| | | | | | | | | | | | M |

*Figure 15B*

| Rep. Addr. | Valid | VP # | Process ID | Operating Priority | Escalate Event No. | Preferred | P0 Event Path No. | ... | Px Event Path No. |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |

Virtual Processor Table (VPT) 244
(One Row Per Virtual Processor)

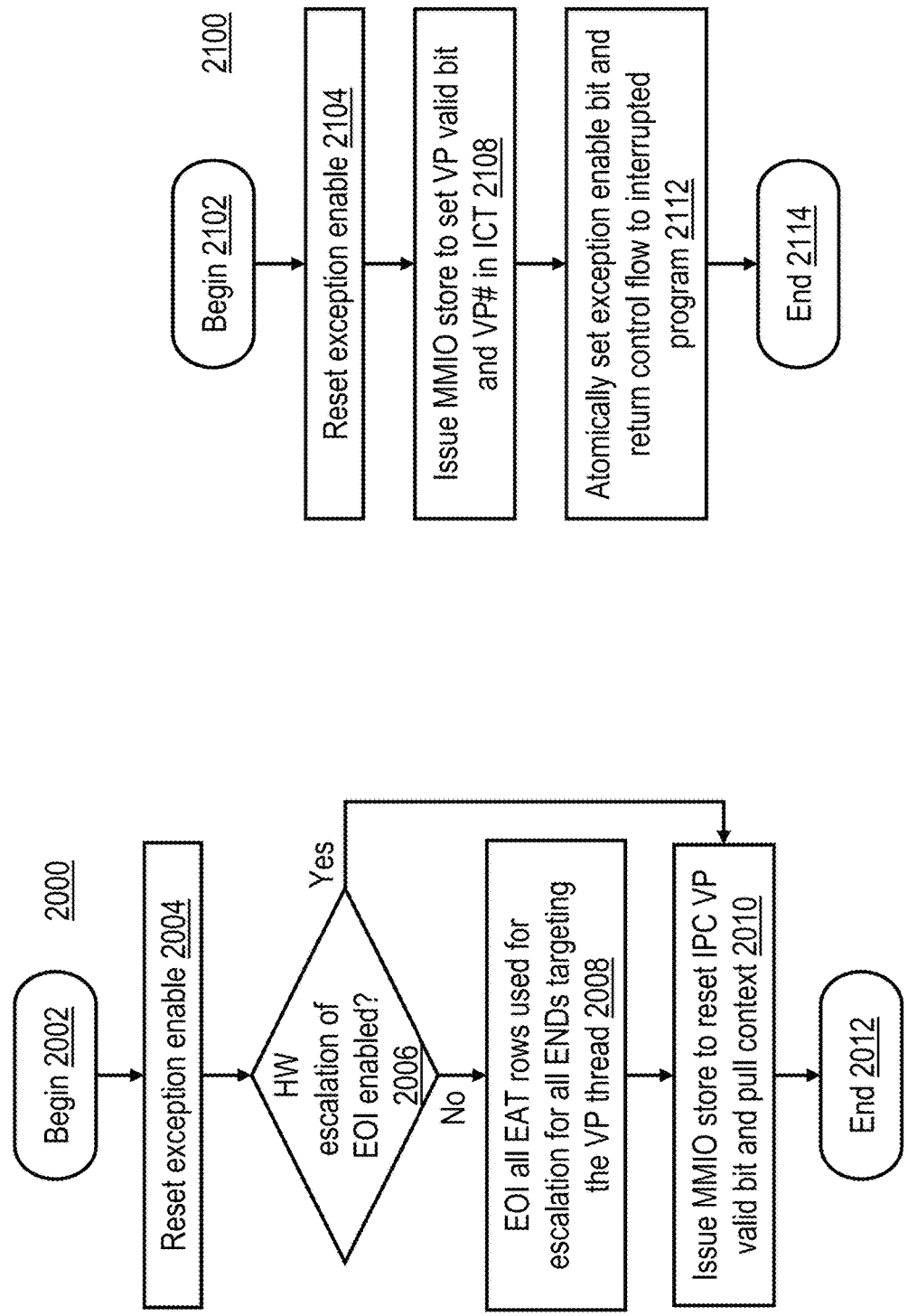

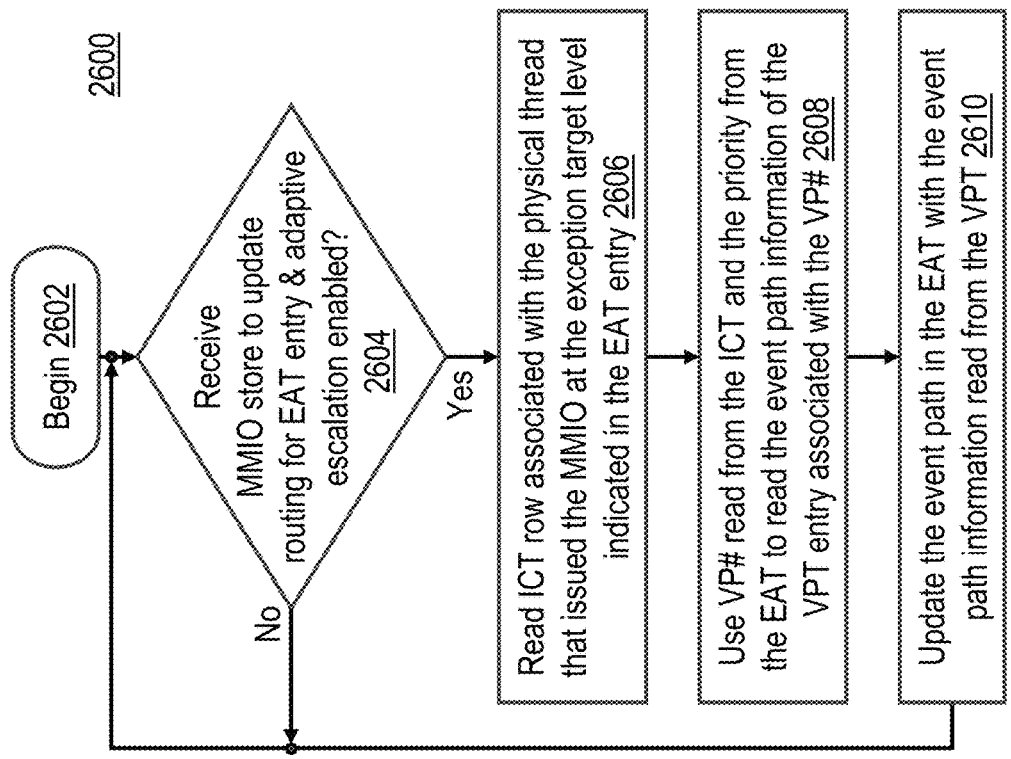

TECHNIQUES FOR ADAPTING ESCALATION PATHS OF INTERRUPTS IN A DATA PROCESSING SYSTEM

BACKGROUND OF THE INVENTION

The present disclosure is generally directed to data processing systems and, more specifically, to techniques for handling interrupt-related information in a data processing system.

In data processing systems, an interrupt signal (interrupt) is generated to indicate to a processor that an event requires attention. Depending on a priority of an interrupt, a processor may respond by suspending current activities, saving state, and executing a function (i.e., an interrupt handler) to service the event. For example, hardware interrupts may be generated by an input/output (I/O) device, e.g., disk drive controller, a keyboard, a mouse, or other peripheral device. In contrast, software interrupts may be caused either by an exception condition in a processor or a special instruction in an instruction set architecture (ISA) that, when executed, causes an interrupt to be generated. Following interrupt servicing, a processor resumes suspended activities.

An interrupt handler, also known as an interrupt service routine (ISR), is a callback function (e.g., implemented in firmware, an operating system (OS), or a device driver) whose execution is triggered by an interrupt. Interrupt handlers perform various interrupt-dependent functions. For example, pressing a key on a computer keyboard or moving a computer mouse triggers interrupts that call respective interrupt handlers to read a key or a mouse position and place associated information into memory of a computer. In data processing systems, an interrupt controller may be implemented to combine multiple interrupt sources onto one or more processor exception lines, while facilitating the assignment of priority levels to different interrupts.

BRIEF SUMMARY

Techniques of adapting an interrupt escalation path are implemented in hardware of a data processing system including a processor core that executes virtual processor threads on physical threads of the processor core. In at least one embodiment, an interrupt controller receives, from a physical thread of the processor core, a request to adapt, in an event assignment data structure, an escalation path for a specified event source, where the escalation path includes a pointer to a first event notification descriptor. The interrupt controller reads an entry for the physical thread in an interrupt context data structure to determine a virtual processor thread running on the physical thread. Based on the virtual processor thread determined from the interrupt context data structure, the interrupt controller accesses an entry in a virtual processor data structure to determine a different second event notification descriptor to which escalations are to be routed. The interrupt controller updates the pointer in the event assignment data structure to identify the second event notification descriptor, such that the interrupt escalation path is adapted.

BRIEF DESCRIPTION OF THE SEVERAL VIEWS OF THE DRAWINGS

FIG. 3A is a diagram of exemplary fields of a conventional event notification message (ENM);

FIG. 3B is a diagram of exemplary fields of a conventional notification rejection message (NRM);

FIG. 3C is a diagram of exemplary fields of a conventional end-of-interrupt (EOI) message;

FIG. 12A is a diagram of exemplary fields of an exemplary ENM that is configured according to one embodiment of the present disclosure;

FIG. 12B is a diagram of an exemplary field of an exemplary escalate message that is configured according to one embodiment of the present disclosure;

FIG. 12C is a diagram of exemplary fields of an exemplary event routing message (ERM) that is configured according to one embodiment of the present disclosure;

FIG. 12D is a diagram of an exemplary field of an exemplary increment backlog (IB) message that is configured according to one embodiment of the present disclosure;

FIG. 12E is a diagram of an exemplary field of an exemplary redistribute message that is configured according to one embodiment of the present disclosure;

FIG. 12F is a diagram of exemplary fields of an exemplary scan backlog (SB) message that is configured according to one embodiment of the present disclosure;

FIG. 14C is a diagram further illustrating additional exemplary fields for an exemplary event notification descriptor table (ENDT) in the IRC of FIG. 14B;

FIG. 15B is a diagram further illustrating additional exemplary fields of an exemplary interrupt context table (ICT) implemented in the IPC of FIG. 15A;

FIG. 15C is a block diagram of exemplary fields of an exemplary virtual processor table (VPT) implemented in the IPC of FIG. 15A in one embodiment;

FIG. 20 is a flowchart of an exemplary process implemented by a processor core, configured according to the present disclosure, to handle interrupts;

FIG. 21 is a flowchart of an exemplary process implemented by a processor core, configured according to the present disclosure, to handle interrupts;

FIG. 26 is a flowchart of an exemplary process for adapting an interrupt escalation path in accordance with one embodiment.

DETAILED DESCRIPTION

Figure 1:
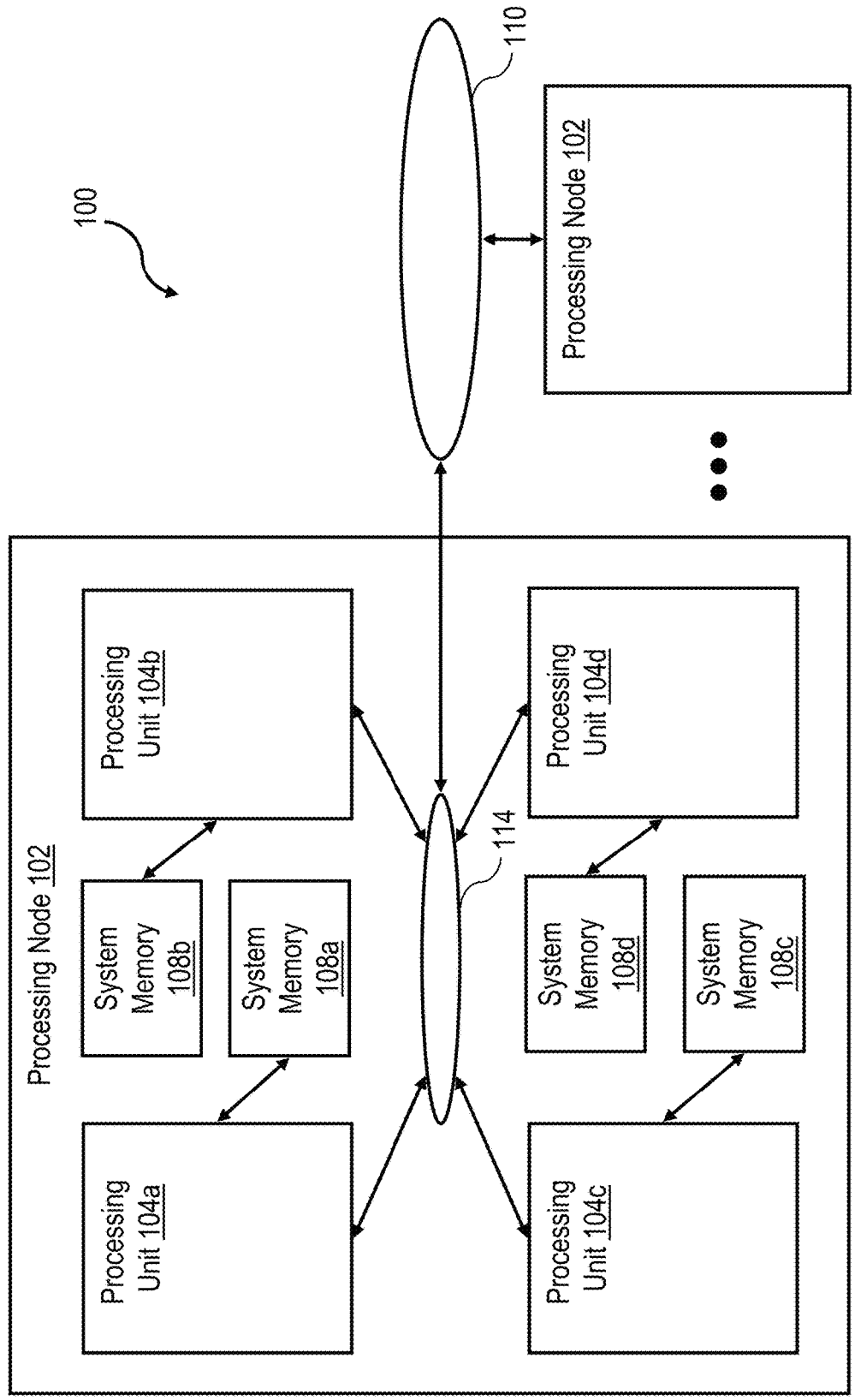
FIG. 1 is a high-level block diagram of an exemplary data processing system in accordance with one embodiment of the present disclosure.

With reference now to the figures, wherein like reference numerals refer to like and corresponding parts throughout, and in particular with reference to FIG. 1, there is illustrated a high level block diagram depicting an exemplary data processing system 100 that implements one or more interrupt presentation controllers (IPCs) and multiple interrupt source controllers (ISCs) configured in accordance with one or more embodiments of the present disclosure. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each which may be realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

Processing units 104 each include a memory controller (not shown) coupled to local interconnect 114 to provide an interface to a respective system memory 108. Data and instructions residing in system memories 108 can generally be accessed, cached, and modified by a processor core in any processing unit 104 of any processing node 102 within data processing system 100. System memories 108 thus form the lowest level of memory storage in the distributed shared memory system of data processing system 100. In alternative embodiments, one or more memory controllers (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
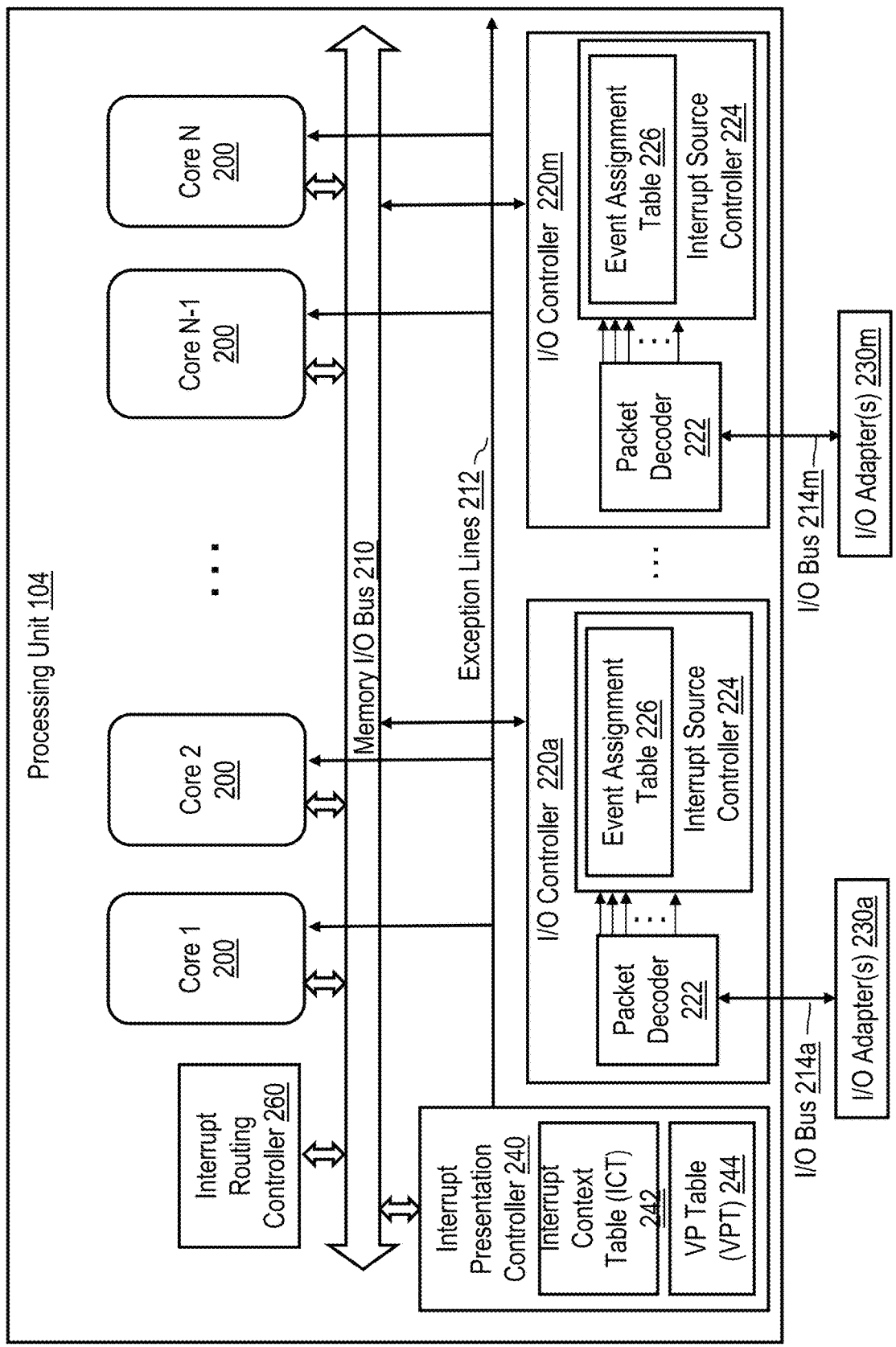
FIG. 2 is a more detailed block diagram of an exemplary processing unit in accordance with one embodiment of the present disclosure.

Referring now to FIG. 2, a more detailed block diagram of an exemplary processing unit 104, in accordance with one embodiment of the present disclosure, is depicted. In the depicted embodiment, each processing unit 104 is an integrated circuit including multiple processor cores 200 for processing instructions and data. In a preferred embodiment, each processor core 200 supports simultaneous multithreading (SMT) and thus is capable of independently executing multiple hardware threads of execution simultaneously.

Figure 16A:
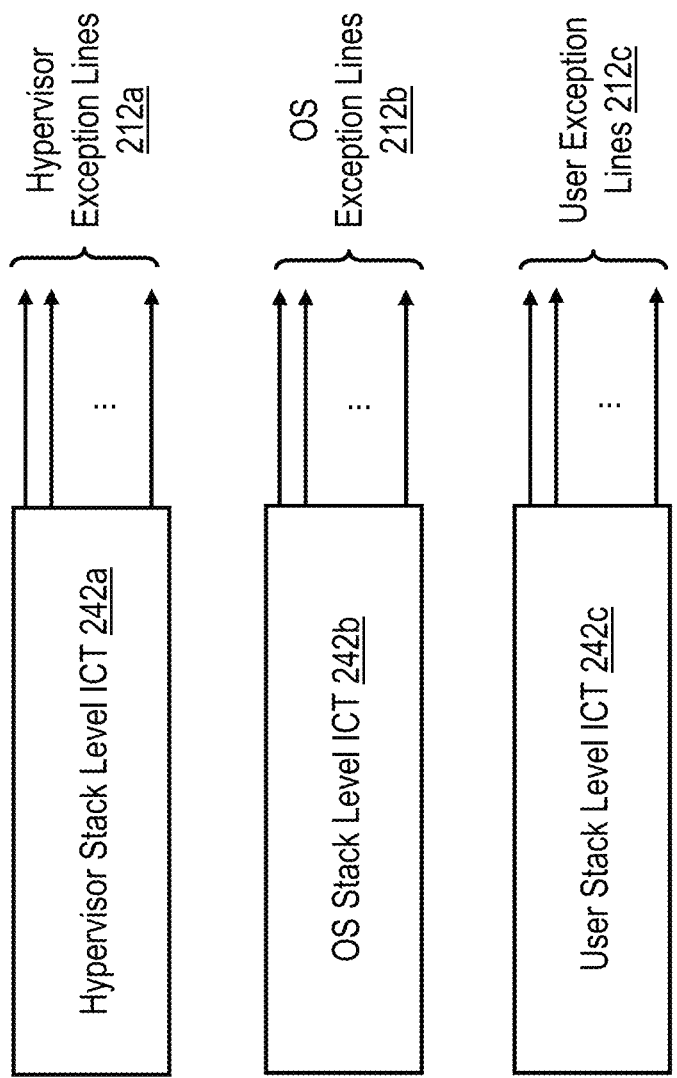
FIG. 16A is a block diagram that illustrates that the IPC of FIG. 15A is configured according to one embodiment of the present disclosure to implement three ICTs, i.e., a hypervisor stack level ICT, an operating systems (OS) stack level ICT, and a user stack level ICT.

Each processor core 200 is coupled to an interrupt presentation controller (IPC) 240 and an interrupt routing controller (IRC) 260 via memory I/O bus 210. In one or more embodiments, IPC 240 includes a single interrupt context table (ICT) 242 that maintains various information for physical processor (PP) threads and is employed by IPC 240 to implement hardware-based (as opposed to software-based) save and restore of virtual processor (VP) thread context in connection with interrupt handling. In one or more other embodiments, a different ICT 242 is implemented for each software stack level that can be dispatched on a PP thread (see, for example, FIG. 16A). As is illustrated in FIG. 16A, ICT 242a is implemented for a hypervisor (Hyp) stack level, ICT 242b is implemented for an operating system (OS) stack level, and ICT 242c is implemented for a user stack level. It should be appreciated that an IPC configured according to the present disclosure may implement more than three different software stack levels. IPC 240 additionally preferably includes a VP table (VPT) 244 into which IPC 240 can save and restore VP thread context information from ICT 242 upon VP thread re-scheduling or pre-emption.

In one or more embodiments, IPC 240 is coupled to each processor core 200 via respective exception lines 212, which are utilized to notify each processor core 200 of an associated interrupt for an assigned virtual processor thread. In embodiments in which a different ICT 242 is implemented for each software stack level, different exceptions lines 212 are implemented for each software stack level. IPC 240 is also coupled to I/O controllers 220 via memory I/O bus 210. IPC 240 is configured to receive/send information via memory I/O bus 210 from/to I/O controllers 220 and/or processor cores 200.

Each I/O controller 220 includes a packet decoder 222 and an interrupt source controller (ISC) 224 that includes an event assignment table (EAT) 226, whose values may be set via software (e.g., by a hypervisor). Each I/O controller 220 is coupled to an I/O adapter 230 via an I/O bus 214. A device or devices (not shown), e.g., disk drive, keyboard, mouse, may initiate interrupt generation by I/O controller 220 by signaling I/O adapter 230 to send a packet to packet decoder 222 of I/O controller 220 via I/O bus 214. EAT 226 includes information that I/O controller 220 uses to create event routing messages (ERMs) that are sent to IRC 260 via memory I/O bus 210. IRC 260 is configured to create event notification messages (ENMs) that are sent to IPC 240 via memory I/O bus 210. While only a single interrupt presentation controller and a single interrupt routing controller are illustrated in FIG. 2, it should be appreciated that a processing unit configured according to the present disclosure may include more than one interrupt presentation controller and/or more than one interrupt routing controller.

With reference now to FIG. 3A, a structure of an exemplary conventional event notification message (ENM) 302 is illustrated. ENM 302 includes an 'event target number' field (which specifies a physical processor thread number), an 'event source number' field, and an 'event priority' field, as well as a field (not shown) that identifies the message as an event notification message. A value in the 'event target number' field identifies a physical processor thread that is to be interrupted to facilitate servicing of an associated interrupt by an associated processor core. A value in the 'event source number' field identifies a notification source that generated the interrupt. A value in the 'event priority' field identifies a priority level of the interrupt. ENM 302 is generated and issued by a conventional ISC 424 (see FIG. 4) to indicate that a notification source (identified by the 'event source number' field) has generated the interrupt and is received and processed by a conventional IPC 540 (see FIG. 5).

With reference now to FIG. 3B, a structure of an exemplary conventional notification rejection message (NRM) 304 is illustrated. NRM 304 includes an 'event source number' field, as well as a field (not shown) that identifies the message as a notification rejection message. NRM 304 is generated and issued by IPC 540 (see FIG. 5) and is received and processed by ISC 424 (see FIG. 4) to indicate, to ISC 424, that the requested interrupt was rejected and needs to be reissued. It should be appreciated that a processing unit configured according to the present disclosure does not utilize NRMs as interrupts are buffered, e.g., within internal memory of IRC 260 or within memory that is external to IRC 260 (but accessible to IRC 260).

With reference now to FIG. 3C, a structure of an exemplary conventional end-of-interrupt (EOI) message 306 is illustrated. EOI message 306 includes an 'event source number' field, as well as a field (not shown) that identifies the message as an EOI message. EOI message 304 is generated and issued by IPC 540 (see FIG. 5) and sent to ISC 424 (see FIG. 4) to indicate, to ISC 424, that an interrupt requested by a device associated with the event source number has been serviced.

Figure 4:
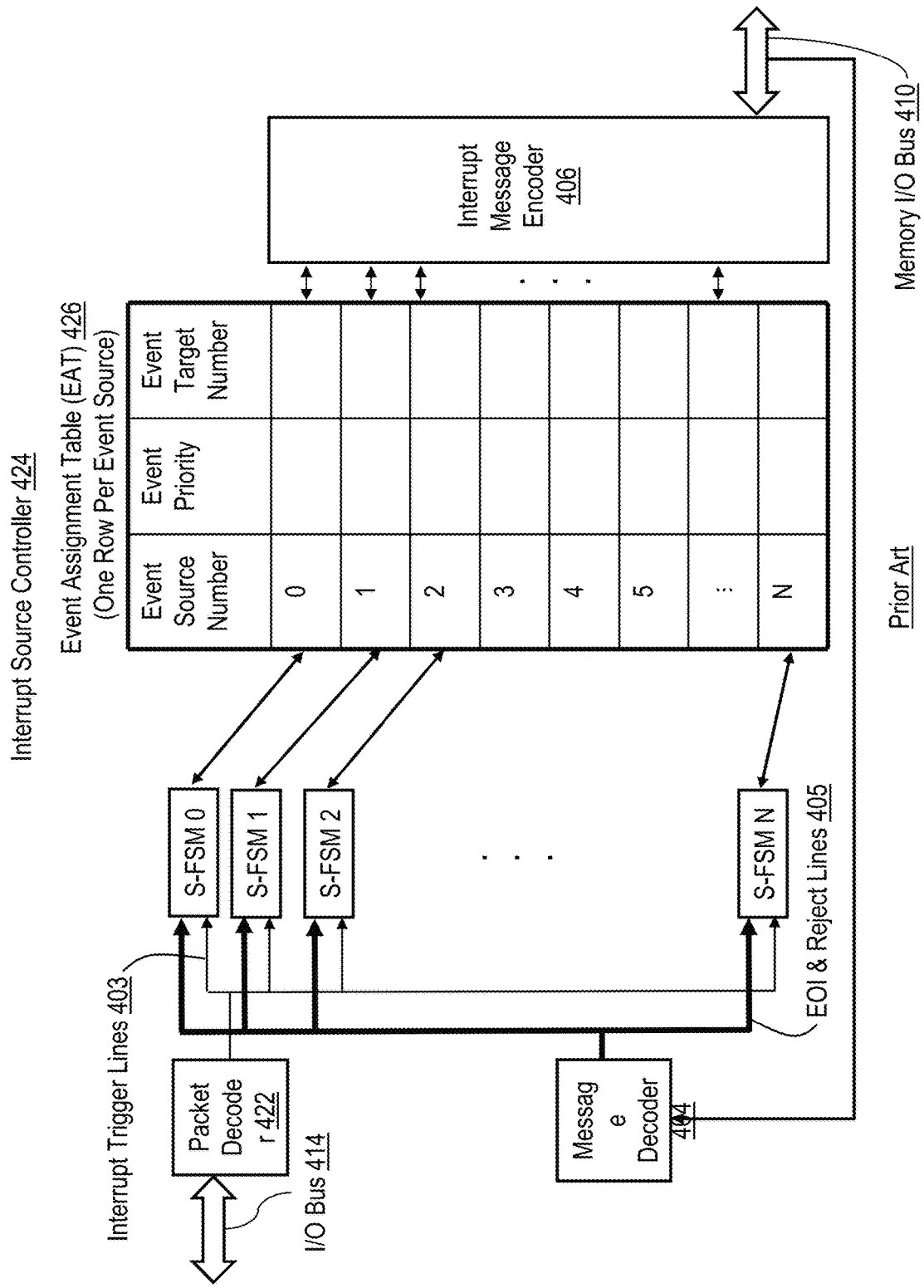
FIG. 4 is a block diagram of relevant components of an exemplary conventional interrupt source controller (ISC)

With reference to FIG. 4, relevant components of conventional ISC 424 are illustrated. It should be appreciated that ISC 424 is replaced by ISC 224 in a processing unit configured according to the present disclosure. ISC 424 is included within an I/O controller that also includes a packet decoder 422 that is coupled to an I/O bus 414 (similar to I/O bus 214 of FIG. 2), a message decoder 404 (that is used to decode EOI messages 306 and/or NRMs 304 received via memory I/O bus 410 (similar to memory I/O bus 210 of FIG. 2)), an event assignment table (EAT) 426, and an interrupt message encoder 406 that utilizes appropriate information in EAT 426 to generate ENMs 302 for an interrupt source. Packet decoder 422 is configured to decode packets received via I/O bus 414 and select a finite state machine (FSM) to process a received packet based on an event source number of a source of the packet. As is illustrated, ISC 424 includes an FSM for each row (i.e., S-FSM 0 through S-FSM N) in EAT 426 that is configured to write information into EAT 426 to facilitate building ENMs 302. It should be appreciated that the event source number illustrated in EAT 426 is not a field, but is only used to indicate a row number. For example, source number '0' is assigned to row number '0' of EAT 426, source number '1' is assigned to row number '1' of EAT 426, etc. In EAT 426, each row has an associated 'event priority' field and an 'event target number' field, whose values are utilized to populate corresponding fields in ENM 302, which is generated by interrupt message encoder 406 when an interrupt is requested by an associated I/O device.

Figure 5:
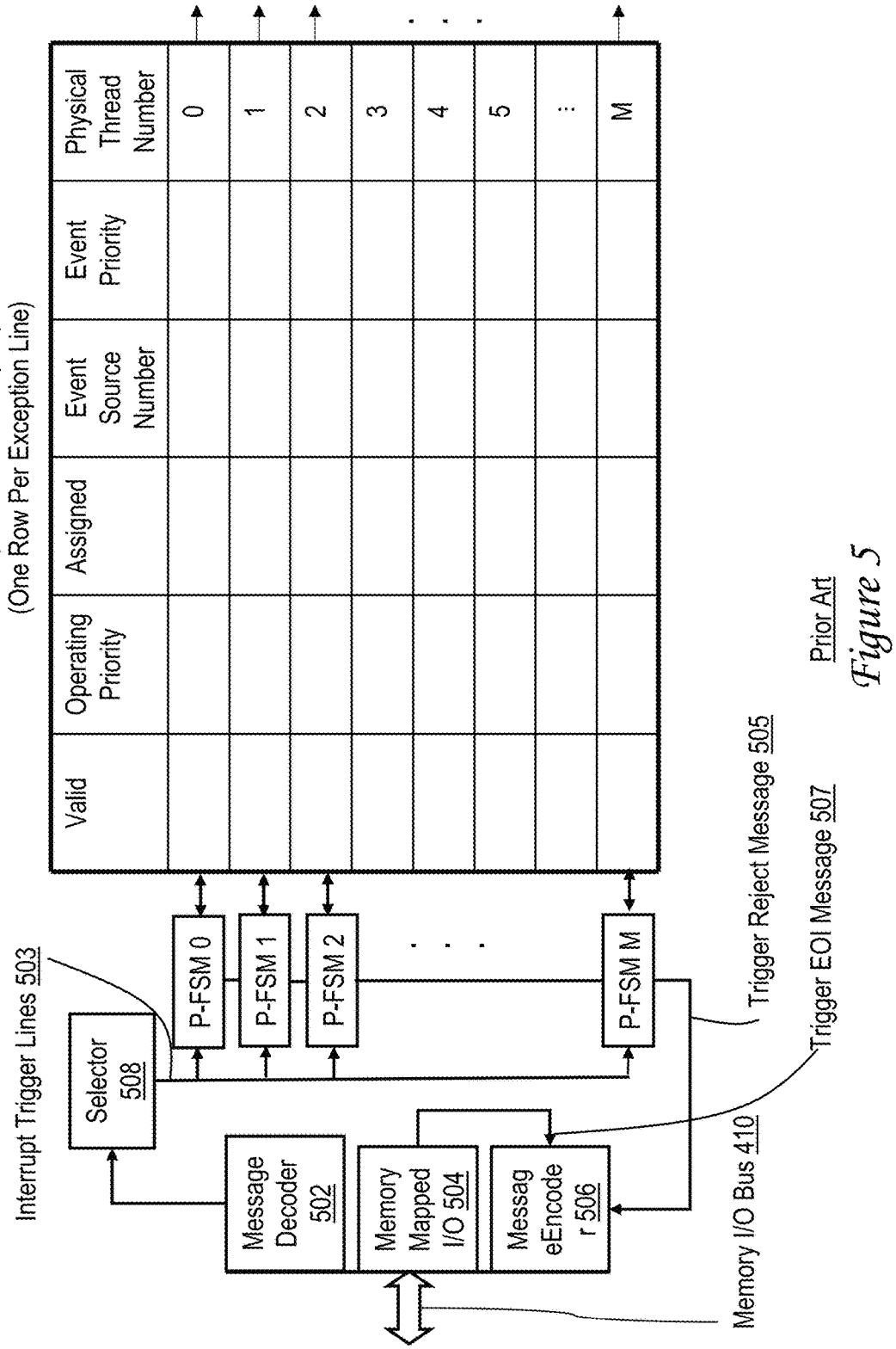
FIG. 5 is a block diagram of relevant components of an exemplary conventional interrupt presentation controller (IPC)

With reference to FIG. 5, relevant components of conventional IPC 540 are illustrated. It should be appreciated that IPC 540 is replaced by IPC 240 in a processing unit configured according to the present disclosure. IPC 540 includes a message decoder 502, a memory mapped I/O (MMIO) unit 504, and a message encoder 506 coupled to memory I/O bus 410. Processor cores communicate with IPC 540 via MMIO unit 504, using MMIO loads and MMIO stores. IPC 540 receives messages from ISC 424 via message decoder 502. IPC 540 generates messages for ISC 424 via message encoder 506. MMIO unit 504 issues a trigger EOI message 507 to message encoder 506 to cause message encoder 506 to generate and send an EOI message 306 on memory I/O bus 410 to ISC 424. Message decoder 502 is coupled to selector 522, which is configured to select an FSM (i.e., one of P-FSM 1 through P-FSM M) based on an event target number associated with a received ENM 302. FSMs of IPC 540 access interrupt context table (ICT) 542 to initiate generation of an exception to a physical processor thread executing on a processor core and to initiate generation of a trigger reject message 505 to message encoder 506, which generates an NRM 304 in response to trigger reject message 505.

It should be appreciated that the physical thread number illustrated in ICT 542 is not a field, but is only used to indicate a row. For example, physical thread number '0' is assigned to row number '0' of ICT 542, physical thread number '1' is assigned to row number '1' of ICT 542, etc. In ICT 542, each row has an associated 'valid' field, an 'operating priority' field, an 'assigned' field, an 'event source number' field, and an 'event priority' field, whose values are set by FSMs and may be accessed to return values to a processor core in response to a MMIO load.

It should be appreciated that various blocks of the processes described herein as being executed by an ISC (both conventionally and per embodiments of the present disclosure) may run simultaneously per row of an associated EAT and that various blocks of the processes described herein as being executed by an IPC (both conventionally and per embodiments of the present disclosure) may run simultaneously per row of an associated ICT. As examples, at least portions of the various processes may be performed by FSM logic associated with a given row of an EAT and/or ICT or an engine may be implemented to perform the various processes while sequencing through all rows of an EAT and/or ICT. It should also be appreciated that processes (see, for example, FIGS. 16C-23) executed by an IRC configured according to the present disclosure may run simultaneously per row of an associated event notification descriptor table (ENDT).

Figure 6:
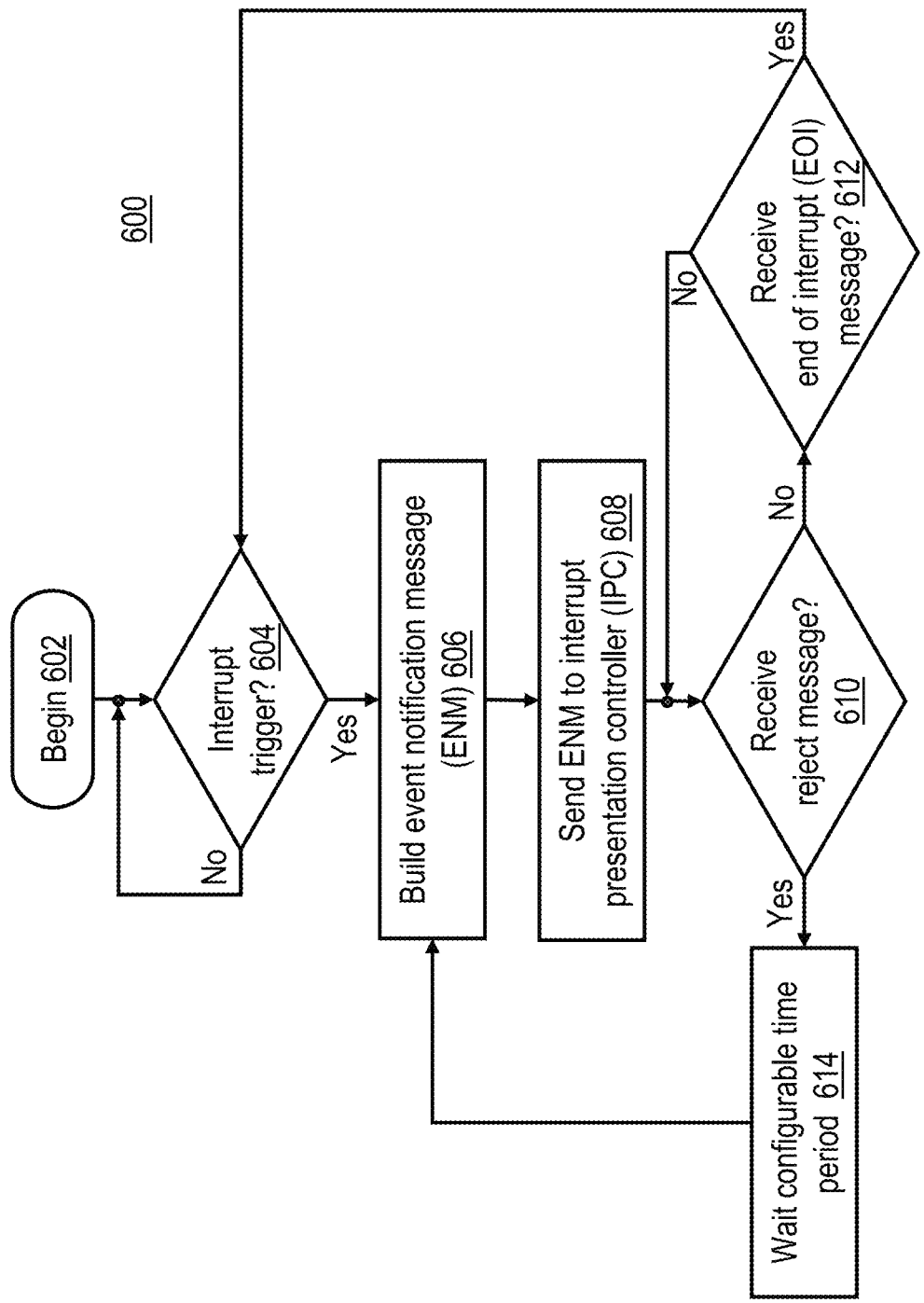
FIG. 6 is a flowchart of an exemplary process implemented by a conventional ISC to handle interrupts.

With reference to FIG. 6 an exemplary process 600 is illustrated that is implemented by ISC 424 to handle interrupts. Process 600 may, for example, be initiated in block 602 when ISC 424 receives input via I/O bus 414. Next, in decision block 604, ISC 424 determines whether the received input corresponds to an interrupt trigger (or interrupt trigger pulse). In response to the received input not being an interrupt trigger control loops on block 604. In response to the received input being an interrupt trigger in block 604 control transfers to block 606. In block 606, ISC 424 builds an ENM 302 based on associated information in EAT 426. Next, in block 608, ISC 424 sends ENM 302 to IPC 540 via memory I/O bus 410.

Then, in decision block 610, ISC 424 determines whether a reject message (i.e., an NRM 304) has been received from IPC 540. For example, IPC 540 may generate an NRM 304 in response to a physical processor thread that is designated to be interrupted to service the interrupt having a higher operating priority than an event priority of the interrupt. In response to ISC 424 receiving an NRM 304 for ENM 302 in block 610 control transfers to block 614, where process 600 waits a configurable time period before returning control to block 606 where another ENM 302 is built for the interrupt. In response to ISC 424 not receiving an NRM 304 for ENM 302 in block 610 control transfers to decision block 612. In block 612, ISC 424 determines whether an EOI message 306 has been received from IPC 540. In response to ISC 424 receiving an EOI message 306 for ENM 302 in block 612 control returns to block 604. In response to ISC 424 not receiving an EOI message 306 for ENM 302 in block 612 control returns to block 610.

Figure 7:
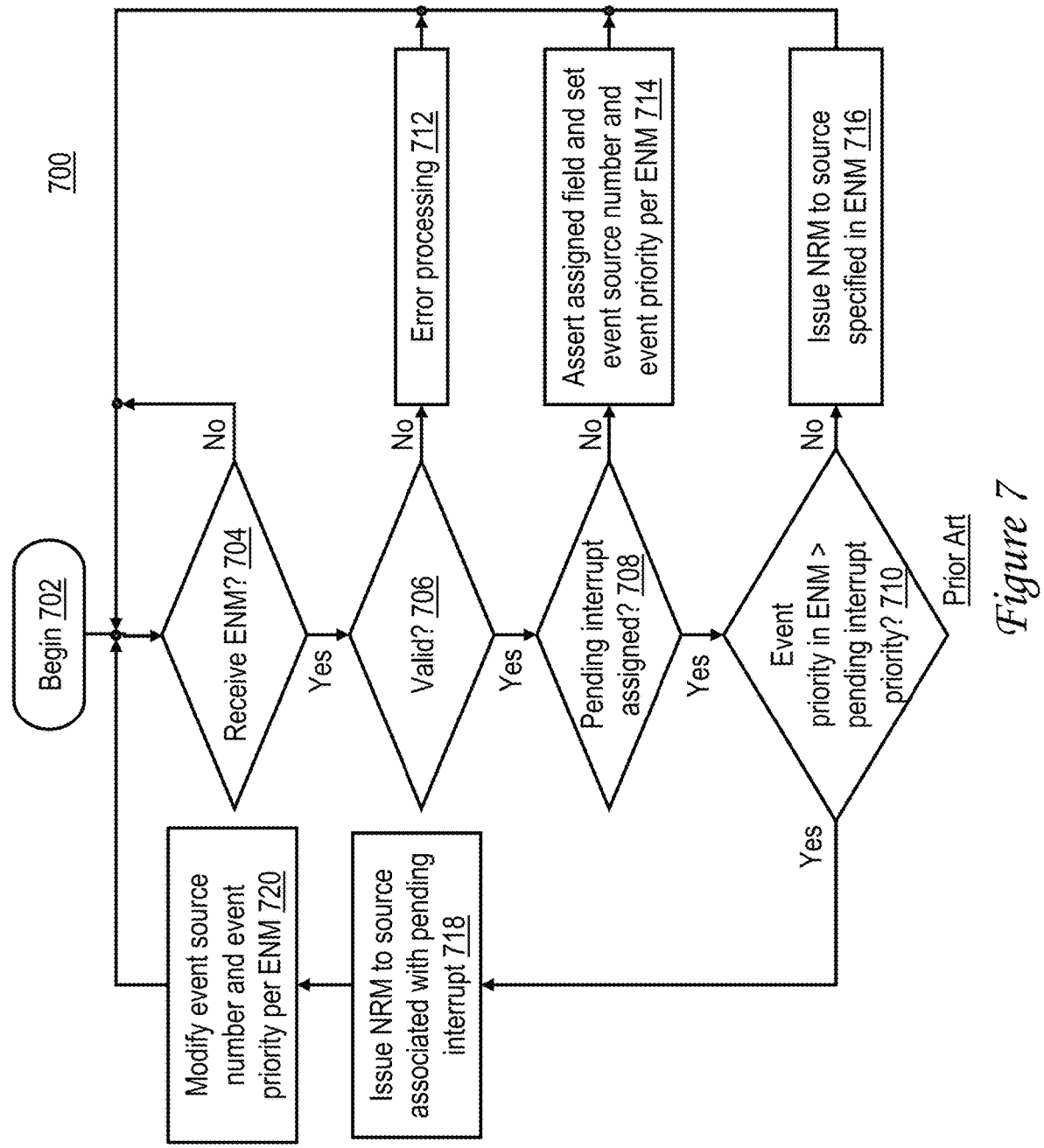
FIG. 7 is a flowchart of an exemplary process implemented by a conventional IPC to handle interrupts.

With reference to FIG. 7 an exemplary process 700 is illustrated that is implemented by IPC 540 to handle interrupts. Process 700 may be initiated in block 702 when IPC 540 receives input via memory I/O bus 410. Next, in decision block 704, IPC 540 determines whether an ENM 302 was received. In response to the received input not being an ENM 302 control loops on block 704. In response to the received input being an ENM 302 in block 704 control transfers to decision block 706. In block 706, IPC 540 determines whether a valid bit for a row in ICT 542 that is assigned to an event target number (i.e., physical processor thread) specified in ENM 302 is asserted (i.e., whether the specified physical processor thread is populated and operational, as specified by a valid field of the physical processor thread in ICT 542).

In response to the valid bit not being asserted in block 706 control transfers to block 712, where error processing is initiated, and then returns to block 704. In response to the valid bit being asserted in block 706 control transfers to decision block 708. In block 708, IPC 540 determines whether a pending interrupt is already assigned to a physical processor thread associated with the event source number (by examining a value of an 'assigned' field of the specified physical processor thread in ICT 542). In response to a pending interrupt not already being assigned to the specified physical processor thread in block 708 control transfers to block 714. In block 714 IPC 540 asserts the 'assigned' field, and sets the 'event source number' field, and the 'event priority' field for the specified physical processor thread based on values included in ENM 302. Following block 714 control returns to block 704.

In response to a pending interrupt already being assigned to the physical processor thread in block 708 control transfers to decision block 710. In block 710 IPC 540 determines whether an event priority of a new interrupt, as specified in the 'event priority' field of ENM 302, is greater than an event priority of an already pending interrupt, as specified in the 'event priority' field of the physical processor thread in ICT 542. In response to the event priority of the new interrupt not being greater than the event priority of the pending interrupt control transfers from block 710 to block 716. In block 716 IPC 540 issues an NRM 304 to the event source number specified in ENM 302 (i.e., the source associated with the new interrupt).

In response to the event priority of the new interrupt being greater than the event priority of the pending interrupt control transfers from block 710 to block 718. In block 718 IPC 540 issues an NRM 304 to the event source number specified in ICT 542 (i.e., the source associated with the pending interrupt). Next, in block 720, IPC 540 modifies the event source number and the event priority, as specified in ENM 302, for the physical processor thread in ICT 542. Following block 720 control returns to block 704.

Figure 8:
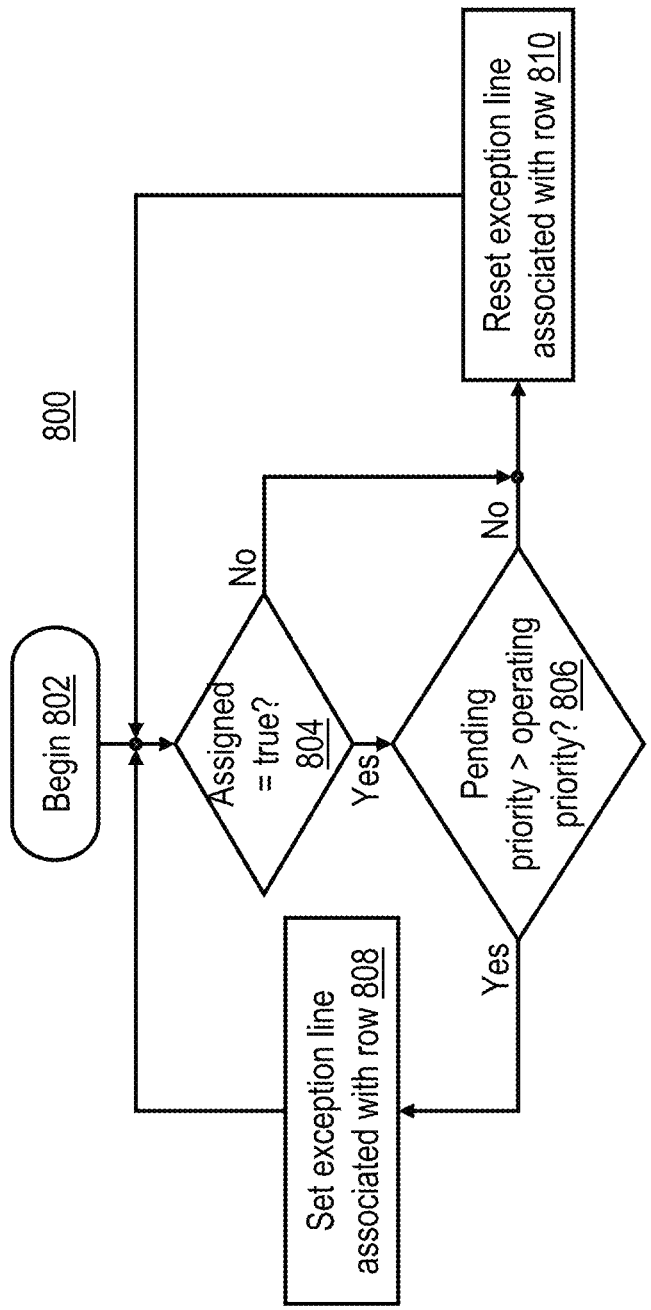
FIG. 8 is a flowchart of another exemplary process implemented by a conventional IPC to handle interrupts.

With reference to FIG. 8 an exemplary process 800 is illustrated that is implemented by IPC 540 to assert/deassert exception lines based on associated 'assigned' fields being asserted (indicating a pending interrupt) and an event priority for the pending interrupt being greater than (or less than or equal to) an operating priority of a physical processor thread that is to be interrupted to facilitate servicing the interrupt by an associated processor core. Process 800 may be periodically initiated in block 802 by IPC 540 to determine whether exceptions lines to respective processor cores require assertion or deassertion. Next, in decision block 804, IPC 540 determines whether an assigned field for each row in ICT 542 is asserted (i.e., true), which indicates that an interrupt is pending for an associated physical processor thread.

In response to an 'assigned' field not being asserted in a row of ICT 542 control transfers from block 804 to block 810. In block 810 IPC 540 deasserts an exception line associated with a row that was recently unassigned or maintains the exception line in a deasserted state for a row that is unassigned, but not recently unassigned. Following block 810 control returns to block 804. In response to an assigned field being asserted in a row of ICT 542 control transfers from block 804 to decision block 806. In block 806, IPC 540 determines whether an event priority of a pending interrupt is greater than an operating priority of an associated physical processor thread.

In response to the event priority of a pending interrupt not being greater than an operating priority of an associated physical processor thread in block 806 control transfers to block 810, where associated exception lines remain deasserted. In response to the event priority of a pending interrupt being greater than an operating priority of an associated physical processor thread in block 806 control transfers to block 808, where associated exception lines are asserted. Following block 808 control returns to block 804.

Figure 9:
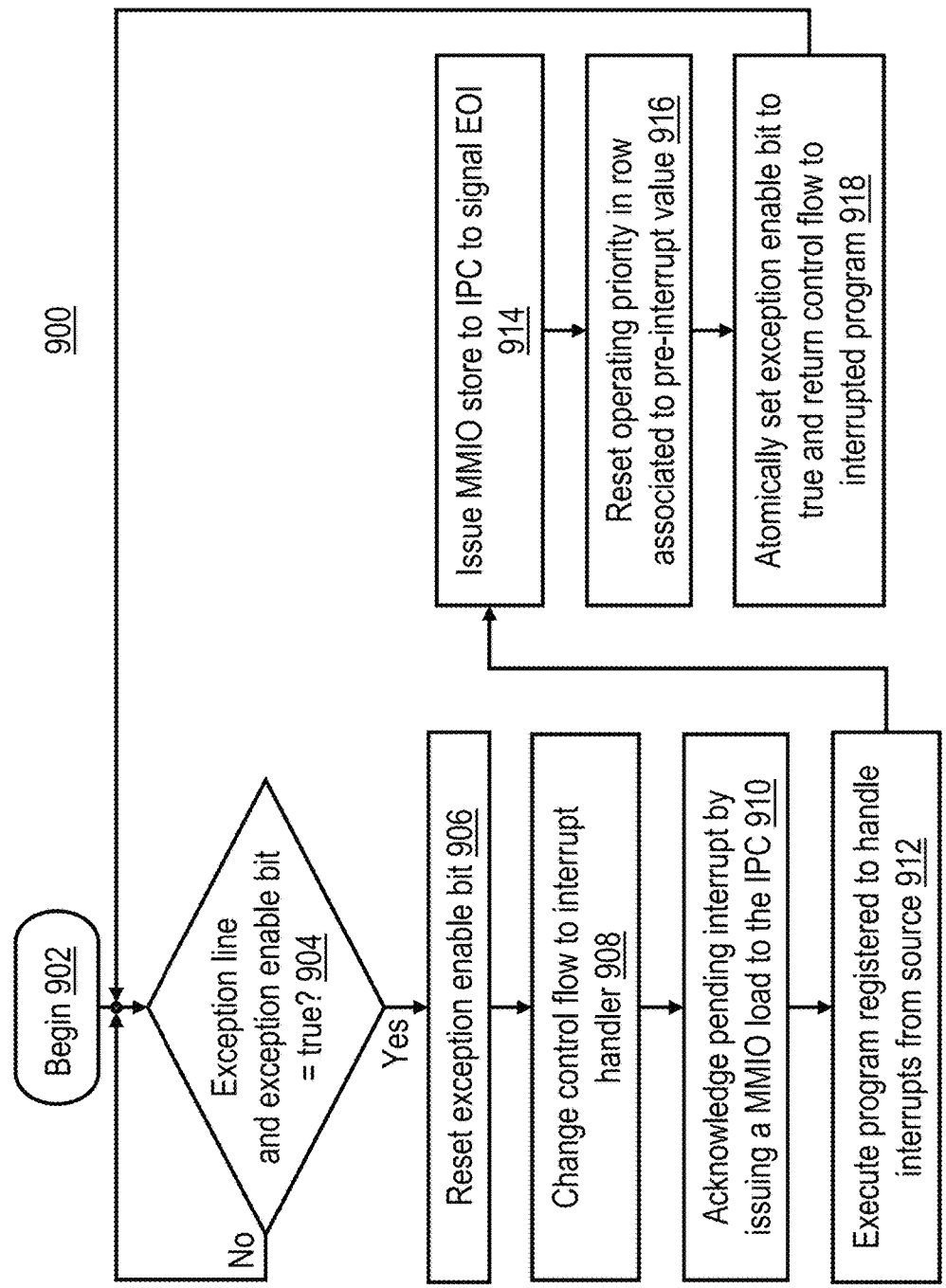
FIG. 9 is a flowchart of an exemplary process implemented by a conventional processor core to handle interrupts.

With reference to FIG. 9, an exemplary process 900 that is implemented by a processor core to handle interrupts is illustrated. It should be appreciated that each processor core maintains an exception enable bit (e.g., in an internal processor register) for each associated exception line. Process 900 may be periodically executed by a processor core to determine whether a physical processor thread should be interrupted to facilitate executing, by the processor core, an interrupt handler to service an interrupt. Process 900 is initiated in block 902 at which point control transfers to decision block 904. In block 904 the processor core determine whether both an exception line and an exception enable bit are asserted (i.e., true). A processor core masks interrupts by deasserting the exception enable bit.

In response to the exception line and/or the associated exception enable bit not being asserted control loops on block 904. In response to both the exception line and the associated exception enable bit being asserted control transfers from block 904 to block 906. In block 906 the processor core deasserts (resets) the exception enable bit (to prevent subsequent interrupts from interrupting the current interrupt). Next, in block 908, the processor core changes control flow to an appropriate interrupt handler. Then, in block 910, the processor core acknowledges the pending interrupt by issuing a MMIO load to IPC 540. Next, in block 912, the processor core executes a program that is registered to handle interrupts from the source (specified by a value in the 'event source number' field).

Next, in block 914, following completion of the program, the processor core issues a MMIO store to IPC 540 to signal an EOI. Then, in block 916, the processor core, resets the operating priority in the row in ICT 542 that is associated with the physical processor thread to a pre-interrupt value. Next, in block 918, the processor core atomically asserts the exception enable bit and returns control flow to a program that was interrupted to service the interrupt. Following block 918 control returns to block 904.

Figure 10:
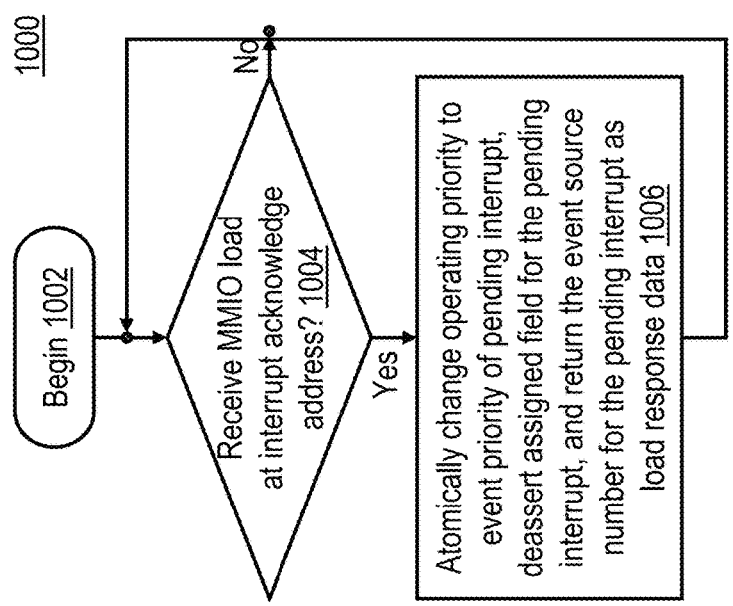
FIG. 10 is a flowchart of yet another exemplary process implemented by a conventional IPC to handle interrupts.

With reference to FIG. 10, an exemplary process 1000 that is implemented by IPC 540 to handle interrupts is illustrated. Process 1000 may be periodically executed by IPC 540 to determine whether IPC 540 has received a communication (e.g., MMIO load or a MMIO store) from a processor core with respect to a pending interrupt. Process 1000 is initiated in block 1002 at which point control transfers to decision block 1004. In block 1004 IPC 540 determines whether a MMIO load has been received at an interrupt acknowledge address.

In response to a MMIO load not being received at the interrupt acknowledge address control loops on block 1004. In response to a MMIO load being received at the interrupt acknowledge address control transfers to block 1006. In block 1006 IPC 540 atomically sets an operating priority to the pending interrupt priority and resets the assigned field for the interrupt in ICT 542, and returns the pending interrupt source number as response data to the MMIO load. From block 1006 control returns to block 1004.

Figure 11:
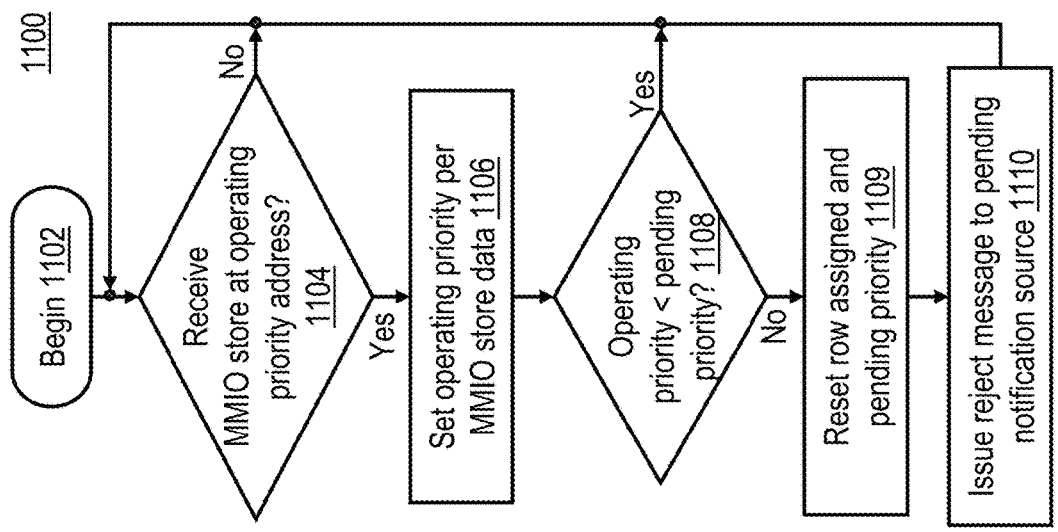
FIG. 11 is a flowchart of still another exemplary process implemented by a conventional IPC to handle interrupts.

With reference to FIG. 11, an exemplary process 1100 that is implemented by IPC 540, to handle changes in operating priority for a physical thread when an interrupt is currently pending, is illustrated. Process 1100 may be periodically executed by IPC 540 to determine whether IPC 540 has received a communication (e.g., a MMIO load or a MMIO store) from a processor core with respect to a pending interrupt. Process 1100 is initiated in block 1102 at which point control transfers to decision block 1104. In block 1104 IPC 540 determines whether a MMIO store (to change an operating priority) has been received at an operating priority address.

In response to a MMIO store not being received at the operating priority address control loops on block 1104. In response to a MMIO load being received at the operating priority address control transfers from block 1104 to block 1106. In block 1106, IPC 540 sets an operating priority for each row in ICT 542 per data associated with the MMIO store. Next, in decision block 1108, IPC 540 determines whether the operating priority is less than the pending event priority for each row in ICT 542. In response to the operating priority being less than a pending event priority control transfers from block 1108 to block 1104 (as a pending interrupt does not require rejection). In response to the operating priority not being less than a pending event priority control transfers from block 1108 to block 1109 where the row assigned bit is deasserted (reset) to indicate an interrupt is no longer pending and the event priority field is reset (e.g., to a lowest value) to indicate that an interrupt is no longer pending. Next, in block 1110, IPC 540 issues a reject message to a notification source associated with the interrupt that was previously pending. From block 1110 control returns to block 1104.

Interrupts have conventionally been maintained in a common interrupt buffer. Software has then been required to decode an event source, use an associated event source number to index a table that indicates a targeted software handler and then redirect the interrupt to the targeted software handler, all of which takes instruction cycles away from executing user programs and delays the initiation of the targeted software handler. Moreover, when the number of outstanding interrupts has exceeded the ability of a conventional interrupt presentation controller (IPC) to individually present an interrupt to an interrupt handler the conventional IPC has rejected the interrupt, which has required a conventional interrupt source controller (ISC) to re-issue the rejected interrupt at a later point in time which tends to increase system bus traffic. According to an aspect of the present disclosure, when an interrupt is preempted context information for the interrupt is saved, e.g., in association with architected processor registers, in a virtual processor context save area in memory. In one or more embodiments, each interrupt handler has an associated buffer area in which events are posted in response to an interrupt trigger. According to other aspects of the present disclosure, the buffer areas are implemented as interrupt destination buffers (IDBs) that facilitate queuing interrupt associated information, which forecloses the need for implementing reject messages (e.g., NRMs) and may reduce memory I/O bus traffic as a data processing system is scaled-up.

With reference to FIG. 12A, a structure of an exemplary event notification message (ENM) 1202, which is configured according to the present disclosure, is illustrated. ENM 1202 includes a 'process ID' field, a 'level' field, an 'event target number' field, a 'number of bits to ignore' field, an 'escalate event number' field, an 'event path number' field, and an 'event priority' field, as well as a field (not shown) that identifies the message as an event notification message. A value in the 'process ID' field (when a user level interrupt is specified) identifies a user process to interrupt (e.g., thirty-two different user processes may be specified). A value in the 'level' field specifies whether the interrupt is a user level interrupt, an OS level interrupt, or a hypervisor level interrupt. A value in the 'event target number' field identifies a virtual processor (VP) thread that is designated to be interrupted to facilitate the servicing of an associated interrupt by an associated processor core. A value in the 'number of bits to ignore' field specifies the number of lower-order bits to ignore in the 'event target number' when determining which VP threads may potentially be interrupted to service the interrupt. A value in the 'escalate event number' field identifies an event source number that is to be utilized in the event a VP thread in a specified software stack (specified in the 'level' field) is not dispatched and an escalate message is received at an interrupt source controller. A value in the 'event path number' field identifies an event path number (i.e., an IDB). A value in the 'event priority' field identifies a priority level of the interrupt.

ENM 1202 is generated by an interrupt routing controller (IRC) 260 that is configured according to the present disclosure (see FIGS. 14B and 14C) and issued to an interrupt presentation controller (IPC) 240 that is configured according to the present disclosure (see FIGS. 15A and 15B) to indicate that a notification source has generated an interrupt or that an interrupt is to be escalated to a higher level. It should be appreciated that ENM 1202 is similar to ENM 302, with some exceptions being that ENM 1202 includes an additional field that specifies a process identifier (i.e., a 'process ID') for a user level interrupt, an additional field that specifies a 'level' (i.e., a user level, an OS level, or a hypervisor level) of an interrupt, an additional field that specifies a 'number of bits to ignore' that is used when selecting a VP thread to interrupt, an additional field that specifies an 'event escalate number', and an 'event path number' field (as contrasted with an 'event source number' field), and that the 'event target number' field identifies a VP thread, as contrasted with a physical processor thread.

For example, assuming that sixteen VP threads are implemented (i.e., VP threads 0000 through 1111) the number of VP threads that may be considered for interruption may be specified as a single VP thread or all sixteen VP threads depending on a value specified in the 'number of bits to ignore' field. As one example, assuming that VP thread eight, i.e., '1000', is specified in the 'event target number' field and that three is specified in the 'number of bits to ignore' field, then eight VP threads (i.e., '1000' through '1111') may be considered for interruption to service an associated interrupt. As another example, assuming that VP thread eight, i.e., '1000', is specified in the 'event target number' field and that zero is specified in the 'number of bits to ignore' field, then only VP thread eight (i.e., '1000') may be considered for interruption to service an associated interrupt. It should be appreciated that various fields mentioned above with respect to ENM 1202 may be optional depending on the embodiment.

With reference to FIG. 12B, a structure of an exemplary escalate message 1204, that is configured according to the present disclosure, is illustrated. Escalate message 1204 includes an 'escalate event number' field, as well as a field (not shown) that identifies the message as an escalate message. Escalate message 1204 is sourced by IPC 240 and received by ISC 224. In response to receiving the escalate message, ISC 224 builds a new event routing message (ERM) 1206 that uses a value provided in the 'escalate event number' field as the event source number for the new ERM 1206.

With reference to FIG. 12C, a structure of an exemplary ERM 1206, that is configured according to the present disclosure, is illustrated. ERM 1206 includes an 'event path number' field and an 'event source number' field, as well as a field (not shown) that identifies the message as an event routing message. ERM 1206 is sourced by ISC 224 and received by IRC 260. In response to receiving ERM 1206, IRC 260 builds a new ENM 1202 that uses a value provided in the 'event path number' field as the event path number for the new ENM 1202.

With reference to FIG. 12D, a structure of an exemplary increment backlog (IB) message 1224, that is configured according to the present disclosure, is illustrated. IB message 1224 includes an 'event path number' field, as well as a field (not shown) that identifies the message as an increment backlog message. IB message 1224 is sourced by IPC 240 and received by IRC 260. In response to receiving IB message 1224, IRC 260 increments a 'backlog count' field in ENDT 1460 that tracks interrupts buffered for the specified event path and associated interrupt handler.

With reference to FIG. 12E, a structure of an exemplary redistribute message 1234, that is configured according to the present disclosure, is illustrated. Redistribute message 1234 includes an 'event path number' field, as well as a field (not shown) that identifies the message as a redistribute message. Redistribute message 1234 is sourced by IPC 240 and received by IRC 260. In response to receiving redistribute message 1234, IRC 260 initiates redistribution of an associated interrupt to a different VP thread in a group of VP threads.

With reference to FIG. 12F, a structure of an exemplary scan backlog (SB) message 1236, that is configured according to the present disclosure, is illustrated. SB message 1236 includes a 'VP #' field (that specifies a VP thread) and an 'operating priority' field (that specifies an operating priority for the VP thread), as well as a field (not shown) that identifies the message as a scan backlog message. SB message 1236 is sourced by IPC 240 and received by IRC 260. In response to receiving SB message 1236, IRC 260 scans for buffered interrupts that require servicing.

Figure 13:
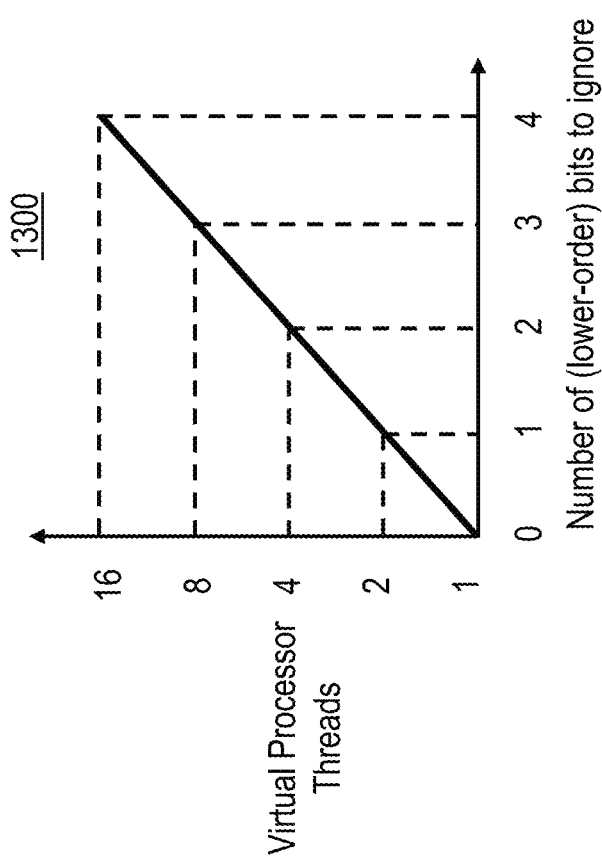
FIG. 13 is a graph that depicts a relationship between the number of lower-order bits to ignore and virtual processor (VP) threads that may service an associated interrupt according to an embodiment of the present disclosure.

With reference to FIG. 13, a graph 1300 is illustrated that depicts a relationship between the number of (lower-order) bits to ignore and VP threads that may potentially service an associated interrupt for a data processing system that deploys up to sixteen VP threads, according to an embodiment of the present disclosure. It should be appreciated that the disclosed techniques are applicable to data processing systems that deploy more or less than sixteen VP threads. As is illustrated in graph 1300, when the 'number of bits to ignore' is four all sixteen VP threads are potentially available to service an associated interrupt. When the 'number of bits to ignore' is three, eight VP threads are potentially available to service an associated interrupt. When the 'number of bits to ignore' is two, four VP threads are potentially available to service an associated interrupt. When the 'number of bits to ignore' is one, two VP threads are potentially available to service an associated interrupt. When the 'number of bits to ignore' is zero, one VP thread is potentially available to service an associated interrupt. In general, where the 'number of bits to ignore' is 'n' bits, a specified virtual processor thread and $2^n-1$ other virtual processor threads may be potentially interrupted.

Figure 14A:
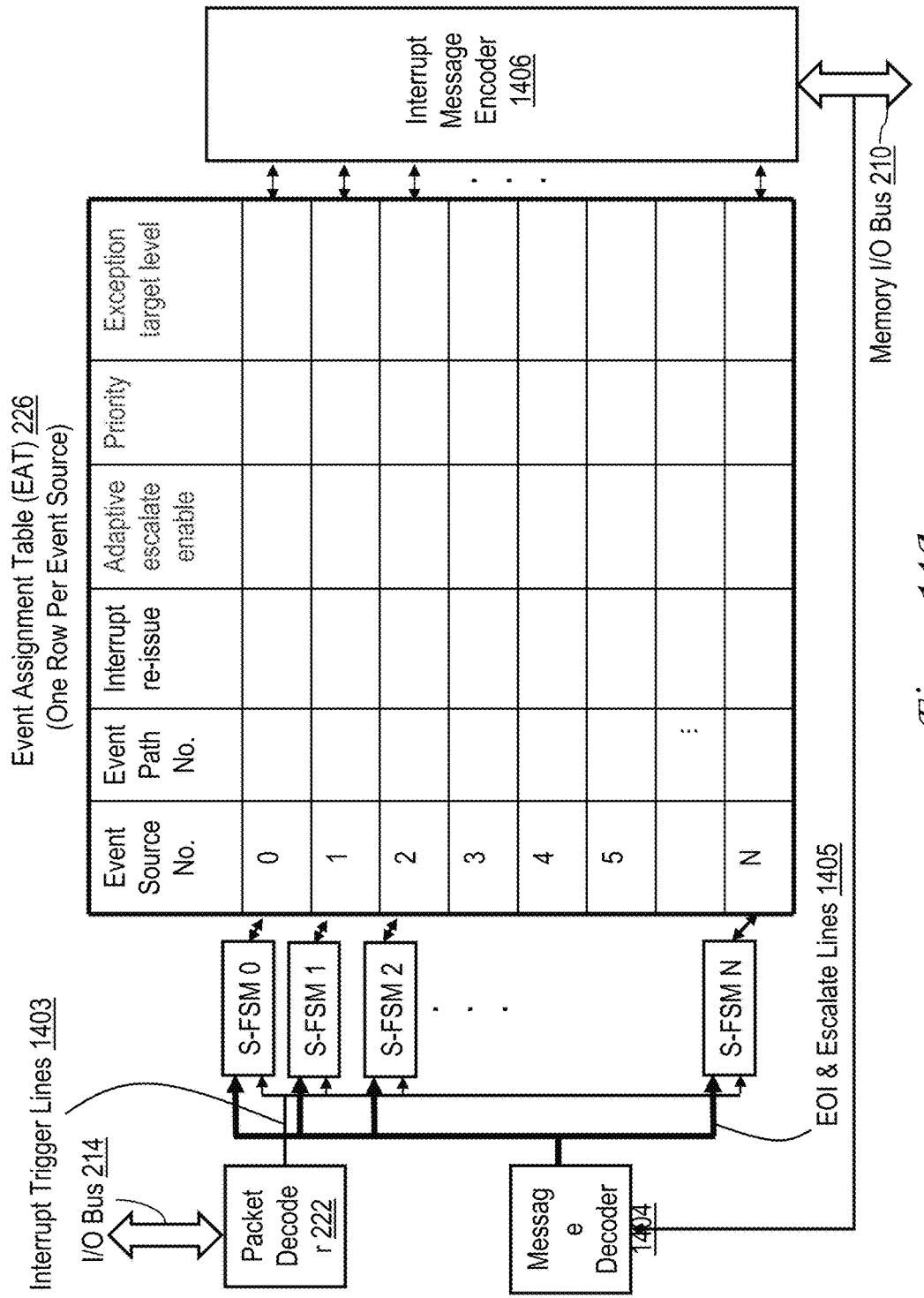
FIG. 14A is a block diagram of relevant components of an exemplary ISC configured according to the present disclosure.

With reference to FIG. 14A, relevant components of ISC 224 of FIG. 2, which is configured according to an embodiment of the present disclosure, are further illustrated. As previously mentioned, I/O controller 220 includes packet decoder 222, which is coupled to I/O bus 214, and ISC 224. ISC 224 includes a message decoder 1404 (that is used to decode conventional EOI messages 306 and escalate messages 1204 received via memory I/O bus 210), EAT 226, and an interrupt message encoder 1406 that utilizes appropriate information in EAT 226 to generate ERMs 1206 for a notification source. Packet decoder 222 is configured to decode packets received via I/O bus 214 and select a finite state machine (FSM) to process the received packet based on an event source number for a notification source of the packet.

As is illustrated, ISC 224 includes an FSM for each row (i.e., S-FSM 0 through S-FSM N) in EAT 226 that is configured to maintain information in EAT 226 to facilitate building ERMs 1206. In one embodiment, a different set of FSMs (not shown) is implemented to handle the generation of ERMs 1206 in response to escalate messages 1204. It should be appreciated that the event source number illustrated in EAT 226 is not a field, but is only used to indicate a row number. For example, source number '0' is assigned to row number '0' of EAT 226, source number '1' is assigned to row number '1' of EAT 226, etc. In EAT 226, each row has an associated 'event path number' field, whose values may be utilized to populate corresponding fields in an ERM 1206, which is generated by interrupt message encoder 1406 when an interrupt is requested by an associated I/O device. In addition, each row of EAT 226 preferably includes an 'interrupt re-issue' field that maintains state information indicating whether or not the associated event source has re-issued a same interrupt trigger.

In the depicted embodiment, each row of EAT 226 additionally includes fields to support the adaptation of escalation paths, as described below with respect to FIGS. 25A-25B and 26. These fields include an 'adaptive escalate enable' field that is set (e.g., to "1") to indicate whether adaptive hardware-based interrupt escalation for interrupts from the associated event source is currently allowed and that is otherwise reset (e.g., to "0"). Each row of EAT 226 also includes a 'priority" field specifying which event path should be selected for adaptive interrupt escalation, as described below. Each row of EAT 226 further includes an 'exception target level' designating a software stack level (e.g., OS level or hypervisor level) to which an escalated interrupt for the associated event source will be directed.

Figure 14B:
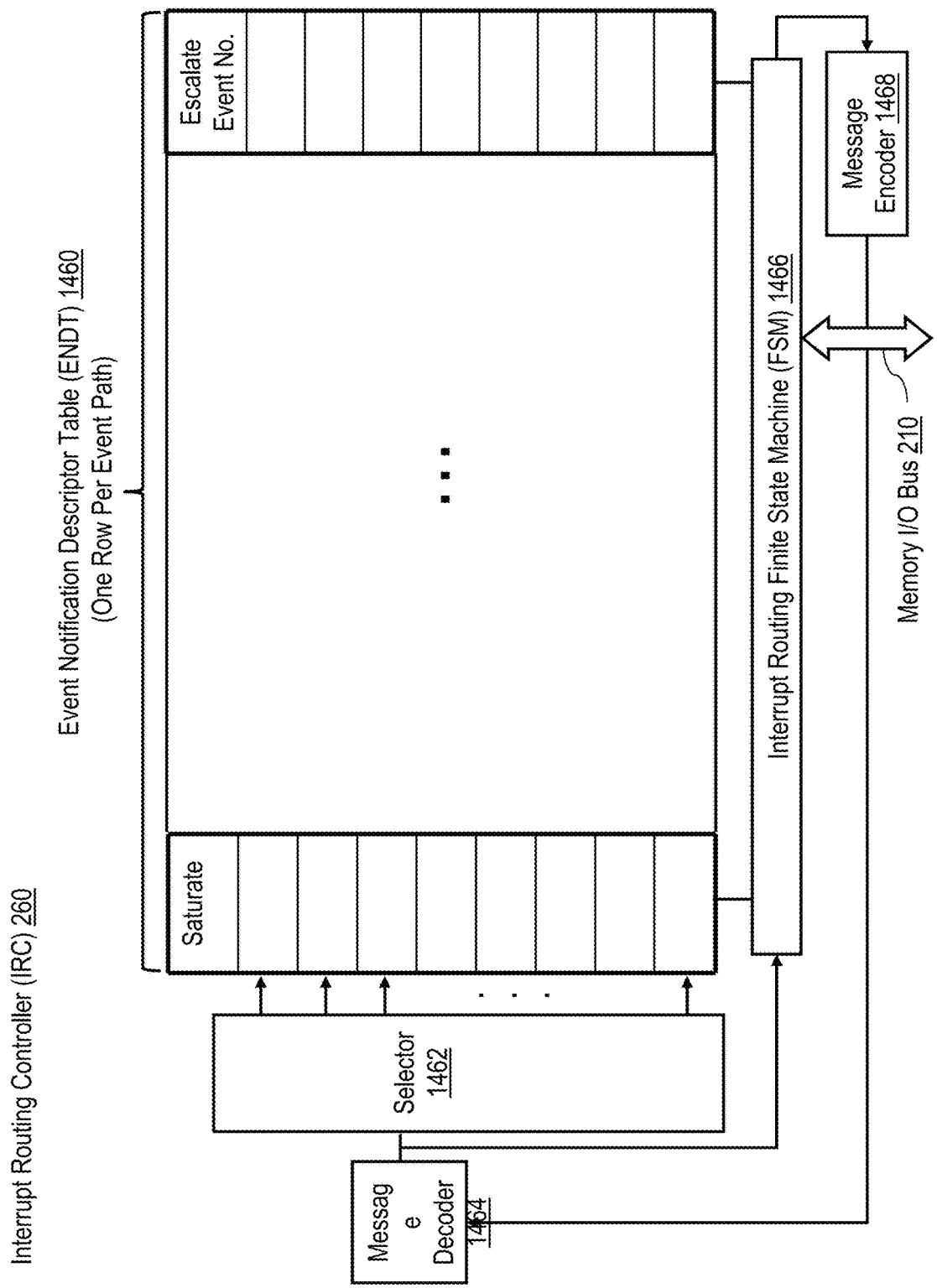
FIG. 14B is a block diagram of relevant components of an exemplary interrupt routing controller (IRC) configured according to the present disclosure.

With reference to FIGS. 14B and 14C, relevant components of IRC 260 of FIG. 2, which is configured according to an embodiment of the present disclosure, are further illustrated. IRC 260 includes a message decoder 1464, a message encoder 1468, and an interrupt routing finite state machine (FSM) 1466, all of which are coupled to memory I/O bus 210. Message decoder 1464 decodes ERMs 1206, IB messages 1224, redistribute messages 1234, and SB messages 1236 received via memory I/O bus 210. An output of message decoder 1464 is coupled to an input of selector 1462 and an input of FSM 1466. IRC 260 also includes an event notification descriptor table (ENDT) 1460 that is coupled to selector 1462 and FSM 1466. Selector 1462 selects an appropriate row (also referred to as an event notification descriptor or event path) in ENDT 1460 responsive to output from message decoder 1464. FSM 1466, which is coupled to message encoder 1468, provides information selected from ENDT 1460 to message encoder 1468 to facilitate the generation of ENMs 1202 for IPC 240.

It should be appreciated that each row in ENDT 1460 corresponds to an event path that manages an IDB (see FIG. 14D) and that an event path number is equivalent to a row number of ENDT 1460. For example, event path number '0' (or IDB0 for VP thread zero at priority zero, i.e., the highest priority for VP thread zero) is assigned to row number '0' of ENDT 1460, event path number '1' (or IDB1 for VP thread zero at priority one) is assigned to row number '1' of ENDT 1460, etc. for all implemented priorities for VP thread zero. Subsequent rows of ENDT 1460 are assigned to event path numbers for each implemented priority for VP thread one, etc. In ENDT 1460, each row has an associated 'saturate field', 'backlog count' field, 'link' field, address ('Addr') field, a generation ('Gen') field, an offset counter ('Offset Ctr') field, a 'size' field, an 'event priority' field, an 'event target number' field, a 'number of bits to ignore' field, a 'level' field, a 'process ID' field, and an 'escalate event number' field. Values in fields of ENDT 1460 may be utilized to populate corresponding fields in an ENM 1202, which is generated by message encoder 1468 responsive to an ERM 1406 when an interrupt is requested by an associated I/O device. Values in the 'Addy' field, the 'Gen' field, the 'Offset Ctr' field, and the 'size' field of ENDT 1460 are used to insert information into associated interrupt destination buffers (IDBs). Values in the 'backlog count' field and the 'link' field are utilized to track interrupts buffered in the IDBs. That is, the value in 'backlog count' field indicates a number of interrupts to be presented for the associated event path, and the value in the 'link' field is used to link all the various event paths that manage IDBs of a given priority that a VP thread may need to service. Values in the 'saturate' field indicate the number of VP threads in an associated group that are potentially available to service an interrupt and are used to limit the number of spurious interrupts (i.e., interrupts that cannot be serviced due to a lack of available VP threads). For example, assuming eight available VP threads in a group then the saturate value may be set equal to eight.

Figure 14D:
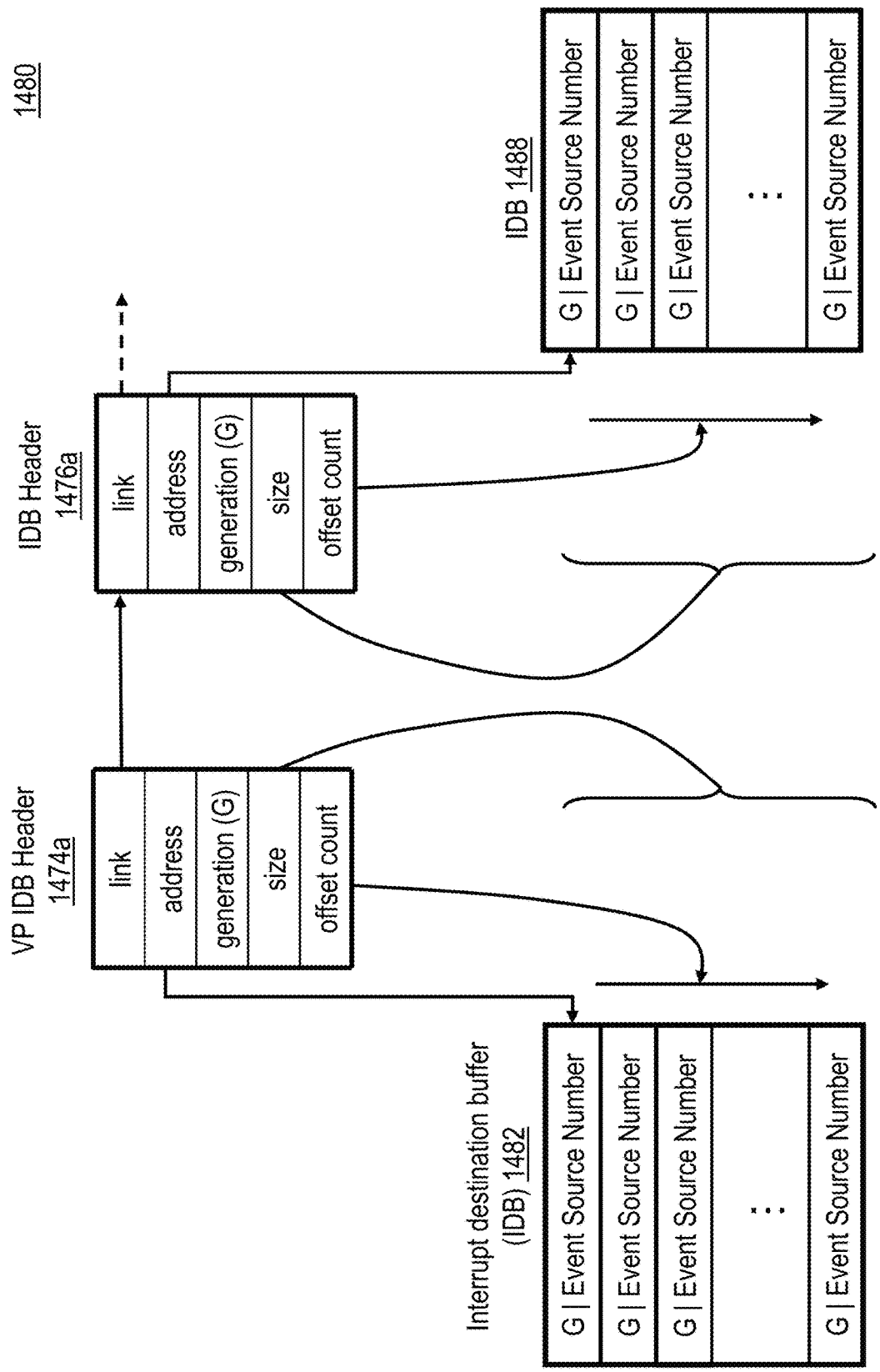
FIG. 14D is a block diagram that illustrates a memory structure that includes a number of interrupt destination buffers (IDBs) that are filled by an IRC configured according to the present disclosure and that are linked via link fields in IDB headers for use by interrupt handling software that empties the IDB memory structures according to the present disclosure.

With reference to FIG. 14D, a block diagram 1480 further illustrates how a specific VP thread IDB 1482 is linked to another IDB 1488 so as to provide interrupt handler programs (that remove IDB entries) an analog of the 'link' field of ENDT 1460. In one or more embodiments, the link field of ENDT 1460 points to specific VP thread IDB 1482, which is linked to IDB 1488 via a link (pointer, which may be an address or partial address) in specific VP thread IDB header 1474a that points to IDB header 1476a. Information in VP thread IDB header 1474a is used to retrieve information from specific VP thread IDB 1482. That is, VP thread IDB header 1474a includes an 'address' field that indicates an address of specific VP thread IDB 1482, a generation 'G' field that provides a single bit that indicates whether a circular buffer that is formed from specific VP thread IDB 1482 has been completely traversed (i.e., has wrapped), a 'size' field that indicates a size of specific VP thread IDB 1482, and an 'offset count' field that indicates what location in specific VP thread IDB 1482 is currently being accessed. As is illustrated, each element (or entry) in specific VP thread IDB 1482 includes a generation 'G' field and an 'event source number' field. It should be appreciated that multiple different event source numbers may be associated with a single event path number. Similarly, information in IDB header 1476a is used to retrieve information from DB 1488, which may, for example, correspond to a group DB.

Figure 15A:
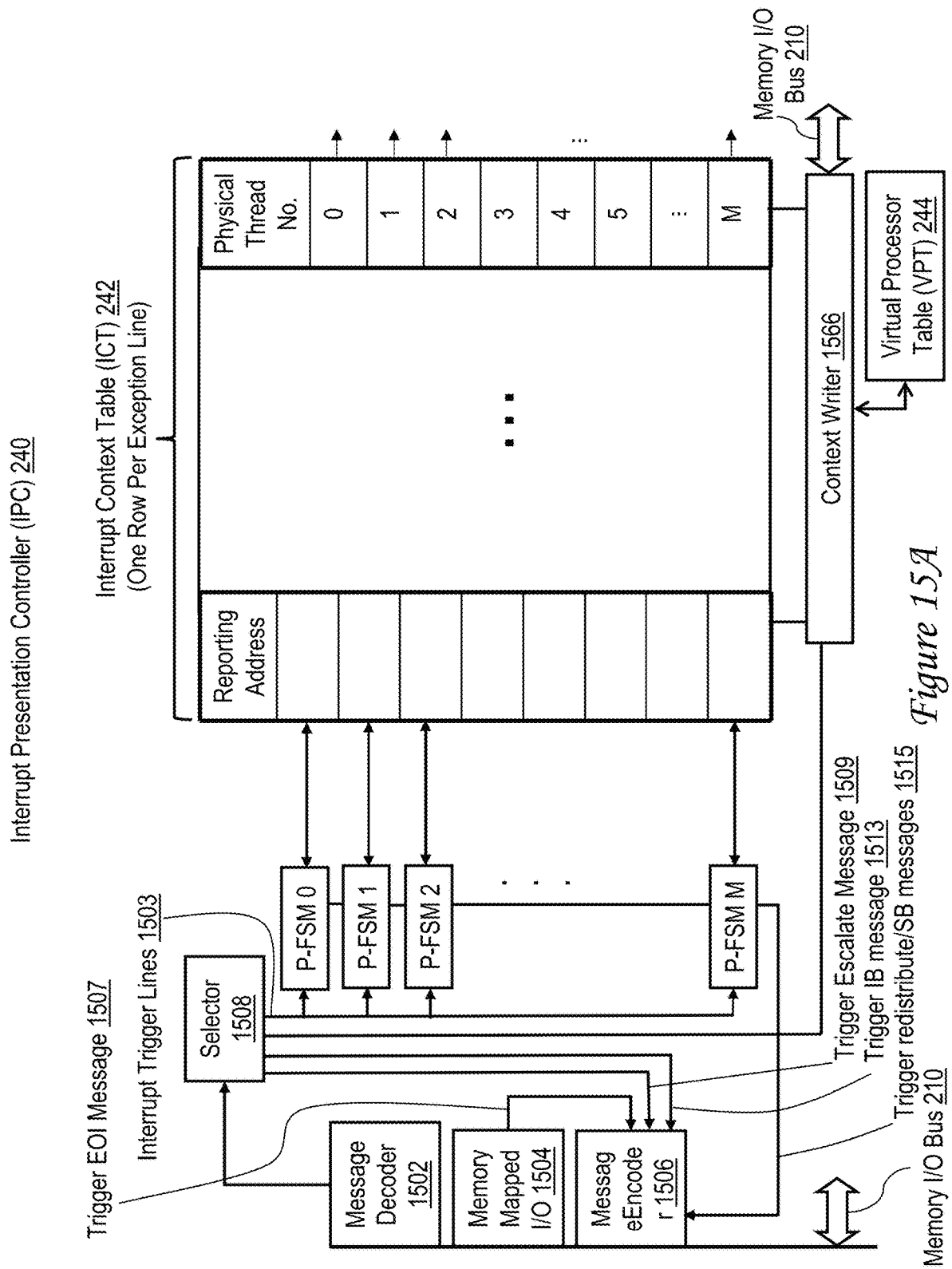
FIG. 15A is a block diagram of relevant components of an exemplary IPC configured according to the present disclosure.

With reference to FIGS. 15A and 15B, relevant components of IPC 240 are further illustrated. IPC 240 includes a message decoder 1502, a memory mapped I/O (MMIO) unit 1504, and a message encoder 1506, all of which are coupled to memory I/O bus 210. Processor cores 200 communicate with IPC 240 via MMIO unit 1504, using MMIO loads and MMIO stores. IPC 240 receives messages from IRC 260 via message decoder 1502. IPC 240 generates messages for ISC 224 and IRC 260 via message encoder 1506. MMIO unit 1504 issues a trigger EOI message 1507 to message encoder 1506 to cause message encoder 1506 to generate and send an EOI message 306 on memory I/O bus 210 to ISC 224. Message decoder 1502 is coupled to selector 1508, which is configured to select an FSM (i.e., one of P-FSM 1 through P-FSM M) for message processing based on an event path number associated with a received ENM 1202. FSMs of IPC 240 access interrupt context table (ICT) 242 to initiate generation of an exception to a physical processor (PP) thread executing on a processor core 200.

Context writer 1566 is coupled to selector 1508, ICT 242, and virtual processor table (VPT) 244, and memory I/O bus 210. Context writer 1566 is configured to write an interrupt context for a preempted interrupt into a row of virtual processor table (VPT) 244 specified by a value of a 'virtual processor thread number' (VP #) field in ICT 242. Selector 1508 is configured to generate a trigger escalate message 1509 and a trigger IB message 1513 to message encoder 1506, which generates an escalate message 1204 in response to trigger escalate message 1509 and an IB message 1224 in response to trigger IB message 1513. Message encoder 1506 is also configured to generate redistribute message 1234 and SB message 1236 (on memory I/O bus 210 for IRC 260) in response to respective redistribute/SB message triggers 1515. Redistribute/SB message triggers 1515 may be generated by P-FSMs in response to a change in operating priority for an associated VP thread.

It should be appreciated that the physical processor thread number of ICT 242 illustrated in FIG. 15B is not a field, but is only used to indicate a row. For example, physical (processor) thread number '0' is assigned to row number '0' of ICT 242, physical thread number '1' is assigned to row number '1' of ICT 242, etc. In ICT 242, each row is illustrated as having an associated 'reporting address' field, 'valid' field, virtual processor thread number ('VP #') field, 'process ID' field (used for user-level interrupts), an 'operating priority' field, an interrupt acknowledge count ('IAC') field, an 'escalate event number' field, an 'assigned' field, an 'event path number' field, an 'event priority' field, and a 'preferred' field, at least some of whose values may be returned to a processor core using a MIMIO load in response to an exception line being asserted by IPC 240.

A value in the 'reporting address' field provides a memory address (or a portion of a memory address) where information of an associated row is to be stored in the event an interrupt is preempted. The 'valid' field indicates whether a processor is installed and powered on and whether a VP is dispatched and operating on an associated physical processor thread. The 'VP #' field specifies a number of the VP thread that is dispatched on the associated physical processor thread. The 'process ID' field specifies a process ID for a user-level interrupt. The 'operating priority' field specifies a priority level of a program currently running on the associated physical processor thread. The 'IAC' field specifies a current IAC that is used to determine whether an associated VP thread has been interrupted too often. In one or more embodiments, the IAC is decremented when the associated VP thread is interrupted and may be periodically incremented while the associated VP thread is dispatched to implement a rate instrument. The 'escalate event number' field (which may, for example, be setup by OS or hypervisor software) specifies an event source number that is used to escalate an interrupt to a higher software level when a VP thread associated with a current software stack level is interrupted too frequently. It should be appreciated that additional similar VP threads may also be dispatched to service a workload when a given VP thread is interrupted too frequently. The 'preferred' field may be utilized by software to indicate a preferred VP thread to interrupt.

As depicted in FIG. 15C, virtual processor table (VPT) 244 is structured similarly to ICT 242. However, because VPT 244 maintains state for preempted interrupts, the rows of VPT 244 omit the 'IAC', 'assigned', and 'event priority' fields. Further, instead of a single 'event path number' field, each row includes a respective 'event path number' field for each interrupt priority level (e.g., P0, P1, Px). The 'event path number' field serves as a pointer to an associated event notification descriptor (i.e., a row in an ENDT) 1460.

With reference to FIG. 16A, one embodiment of ICT 242 is further illustrated as including three different ICTs (i.e., a hypervisor stack level ICT 242a, an OS stack level ICT 242b, and a user stack level ICT 242c), each of which has different associated exception lines 212a, 212b, and 212c routed to processor cores 200. In at least one embodiment, only ICT 242c includes a 'process ID' field.

Figure 16B:
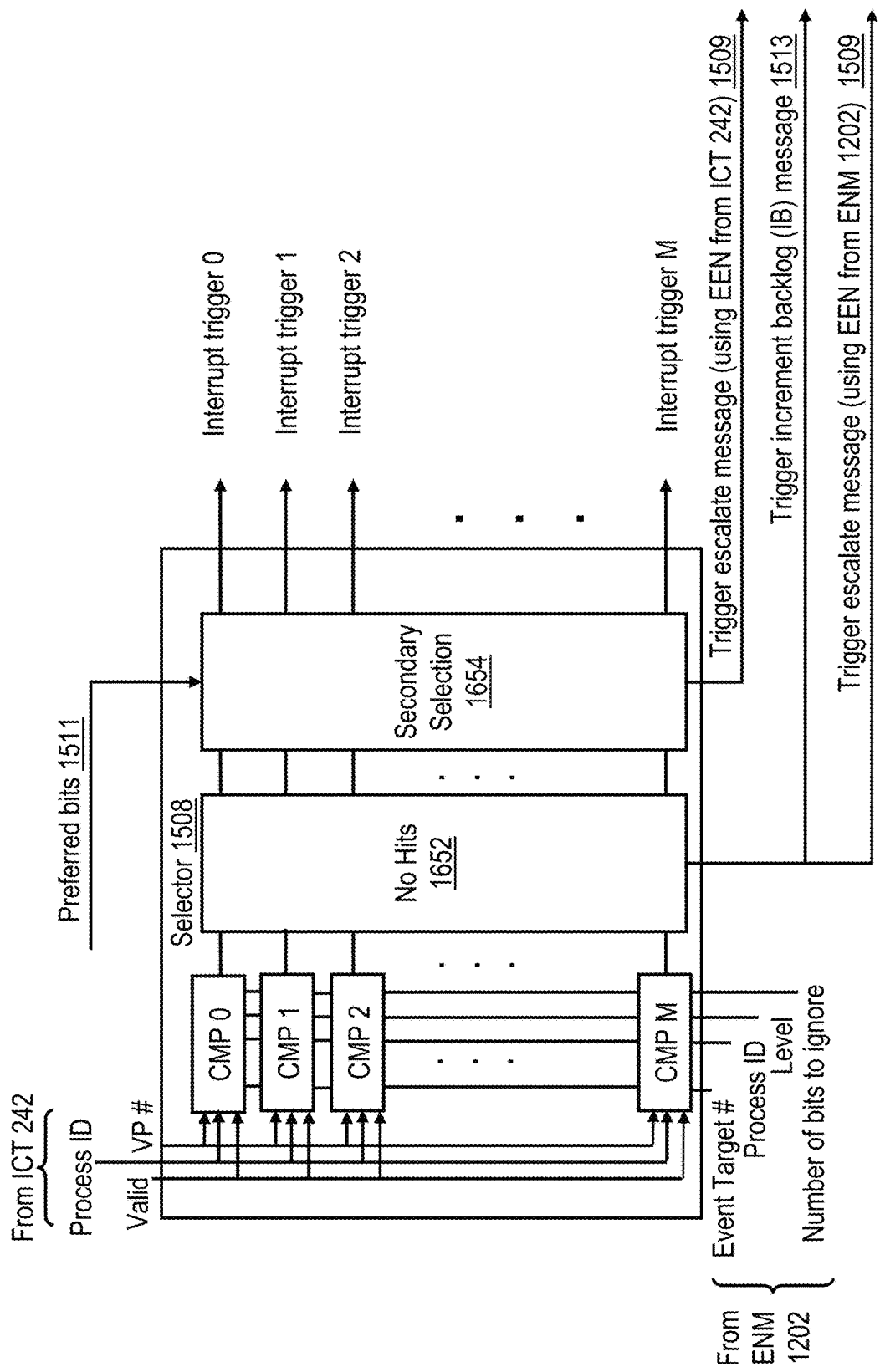
FIG. 16B is a block diagram of relevant components of an exemplary selector of the IPC of FIG. 15A.

With reference to FIG. 16B, relevant components of selector 1508 of IPC 240 of FIGS. 15A and 15B are further illustrated, according to one embodiment of the present disclosure. As is depicted, selector 1508 include comparators (CMP 0 through CMP M), i.e., one for each row in ICT 242, that compare an 'event target number', a 'process ID' for user level interrupts, a 'level', and 'number of bits to ignore' provided in ENM 1202 and 'valid', 'process ID' for user level interrupts, and 'VP #' values stored in respective rows of an appropriate one of ICTs 242a, 242b, or 242c. Outputs of the comparators are provided to a 'no hits' unit 1652 which determines whether any VP threads are available to be interrupted (when the interrupt is a user level interrupt the process IDs are also compared). In the event zero VP threads are available to be interrupted, 'no hits' unit 1652 issues trigger escalate message 1509 and increment backlog (IB) message 1513 to message encoder 1506 (see FIG. 15A). In the event more than one VP thread is available to be interrupted, 'secondary selection' unit 1654 determines which VP thread should be interrupted and issues an appropriate interrupt trigger to trigger an interrupt on an associated physical processor thread.

'Secondary selection' unit 1654 may implement various secondary selection criteria in determining which available VP thread to select for interruption. For example, 'secondary selection' unit 1654 may select a VP thread to interrupt based on 'event priority' relative to 'operating priority', least recently used (LRU), and/or random, etc. According to one aspect of the present disclosure, 'preferred' bits 1511 from appropriate rows (sourced from a 'preferred' field of ICT 242) are utilized by secondary selection unit 1654 in determining which one of multiple VP threads is selected to be interrupted to service the interrupt. It should be appreciated that the various selection criteria may be implemented in series to select a single VP thread when multiple VP threads are still available after a given selection process. In one or more embodiments, when no VP thread is available to be interrupted based on an 'event priority' of the interrupt being less than an 'operating priority' of all of the multiple VP threads, IPC 240 issues escalate message 1204 to ISC 224 using an appropriate row of ICT 242 as a source for the escalate event number.

Figure 16C:
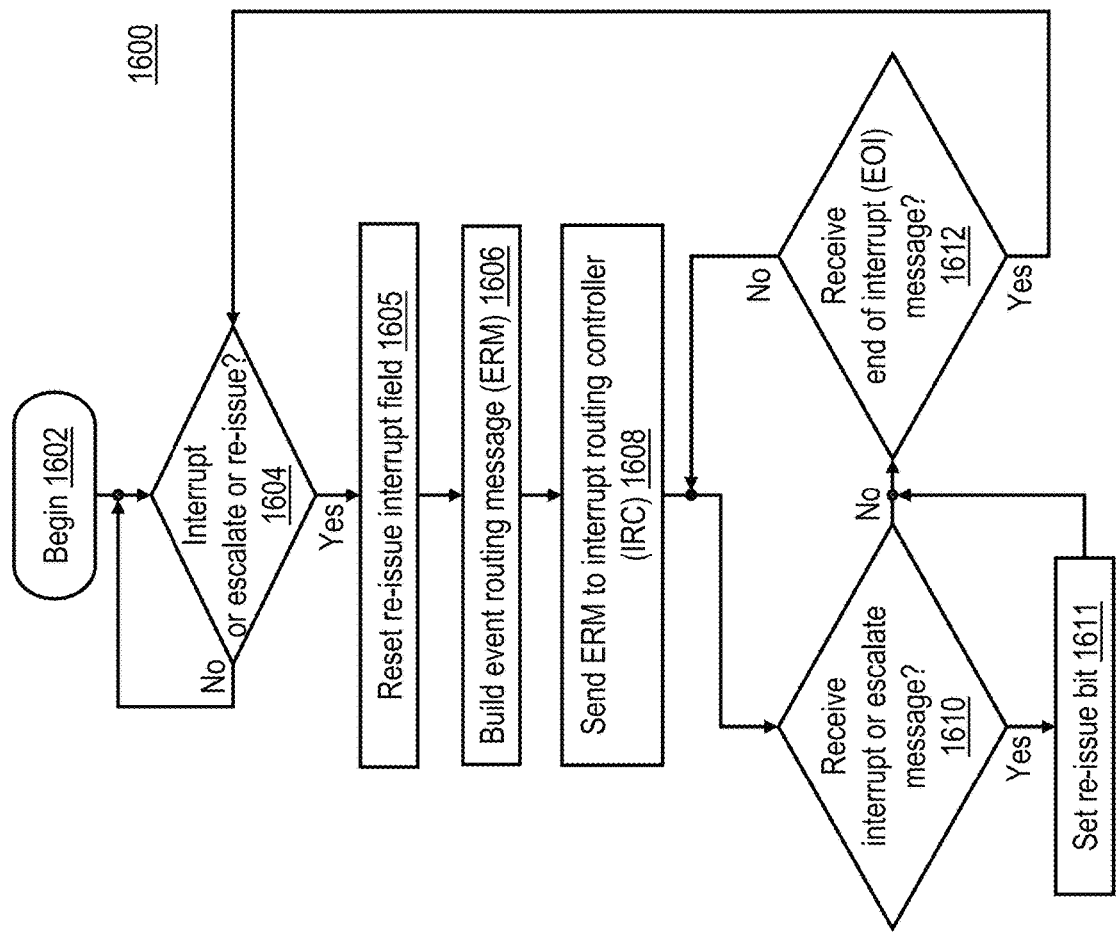
FIG. 16C is a flowchart of an exemplary process implemented by an ISC, configured according to an embodiment of the present disclosure, to handle interrupts.

With reference to FIG. 16C, an exemplary process 1600 that can be implemented by ISC 224 to handle interrupts is illustrated. Process 1600 may, for example, be initiated in block 1602 when ISC 224 receives input via I/O bus 214 or via memory I/O bus 210. Next, in decision block 1604, ISC 224 determines whether the received input corresponds to an interrupt trigger (or interrupt trigger pulse) or an escalate message 1204 or a re-issue of an interrupt trigger for an interrupt that is still pending. ISC 224 can determine that an input corresponds to a still-pending interrupt by reference to the 'interrupt re-issue' field of the row in EAT 226 associated with the relevant event source. In response to the received input not corresponding to an interrupt trigger or escalate message 1204 or reissue of an interrupt trigger for a still-pending interrupt, process 1600 loops back to block 1604. In response to a determination at block 1604 that the received input is an interrupt trigger or escalate message 1204 or re-issue of an interrupt trigger, process 1600 proceeds from block 1604 to block 1605. Block 1605 depicts ISC 224 resetting the 're-issue interrupt' field of the row in EAT 226 associated with the relevant event source.

In block 1606, ISC 224 builds an ERM 1206 based on associated information in EAT 226. It should be appreciated that when the received input is an escalate message 1204 with an associated escalate event number, the escalate event number is utilized as the event source number in building a new ERM 1206. Next, in block 1608, ISC 224 issues ERM 1206 to IRC 260 via memory I/O bus 210. At block 1610, ISC 224 determines whether or not an additional interrupt trigger or escalate message 1204 has been received from the event source. If not, the process passes to block 1612. If, however, ISC 224 determines at block 1610 that an interrupt trigger or escalate message 1204 has been received from the event source, ISC 224 sets the 're-issue interrupt' field of the row in EAT 226 associated with the relevant event source (block 1611). At block 1612, ISC 224 additionally determines whether an EOI message 306 has been received from IPC 240. In response to ISC 224 determining at block 1612 that an EOI message 306 has not been received, process 1600 loops back to block 1610, which has been described. In response, however, to ISC 224 receiving an EOI message 306 at block 1612, process 1600 returns to block 1604, which has been described.

Figure 16D:
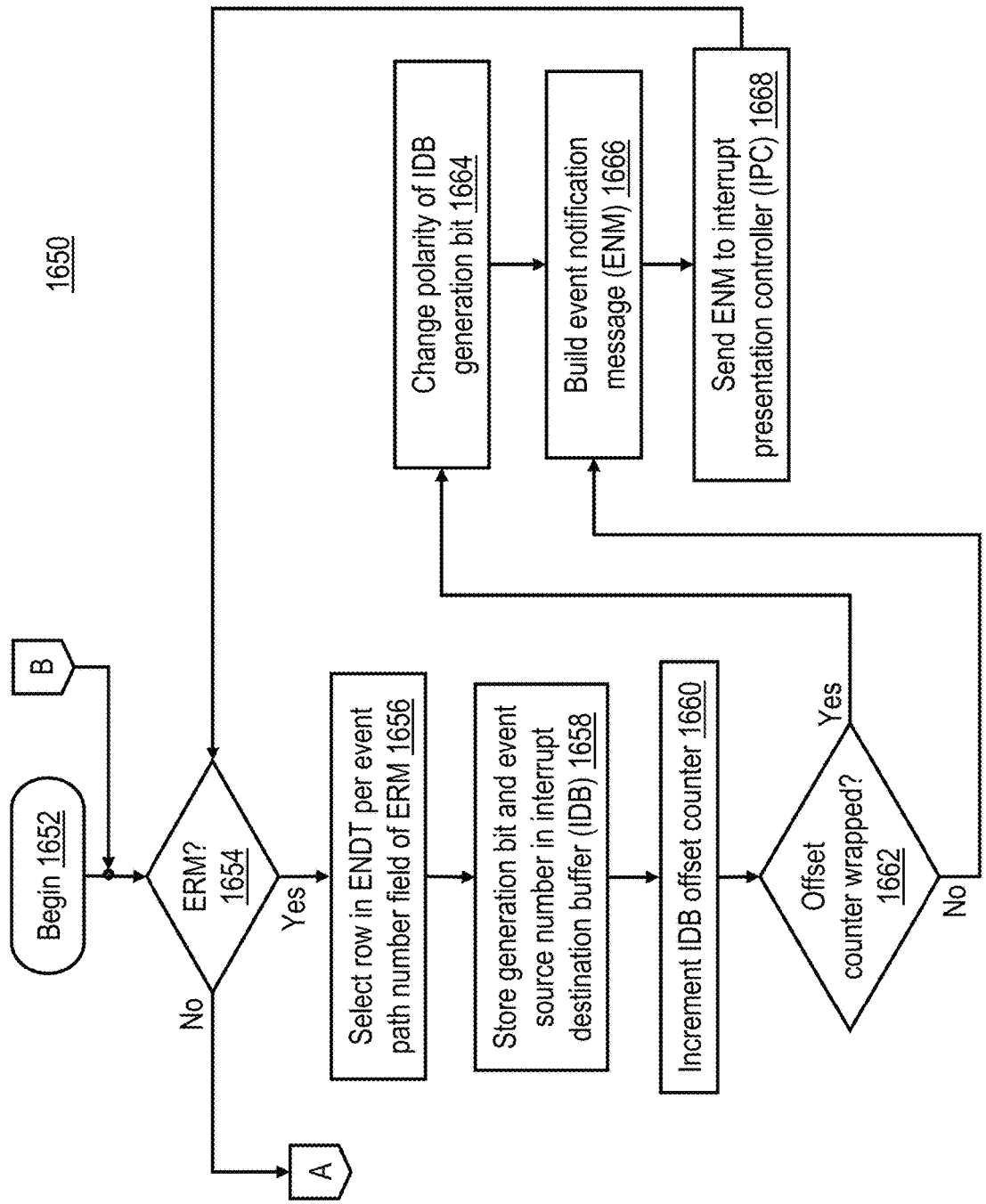
FIGS. 16D and 16E depict a flowchart of an exemplary process implemented by an IRC configured, according to an embodiment of the present disclosure, to handle interrupts.
Figure 16E:
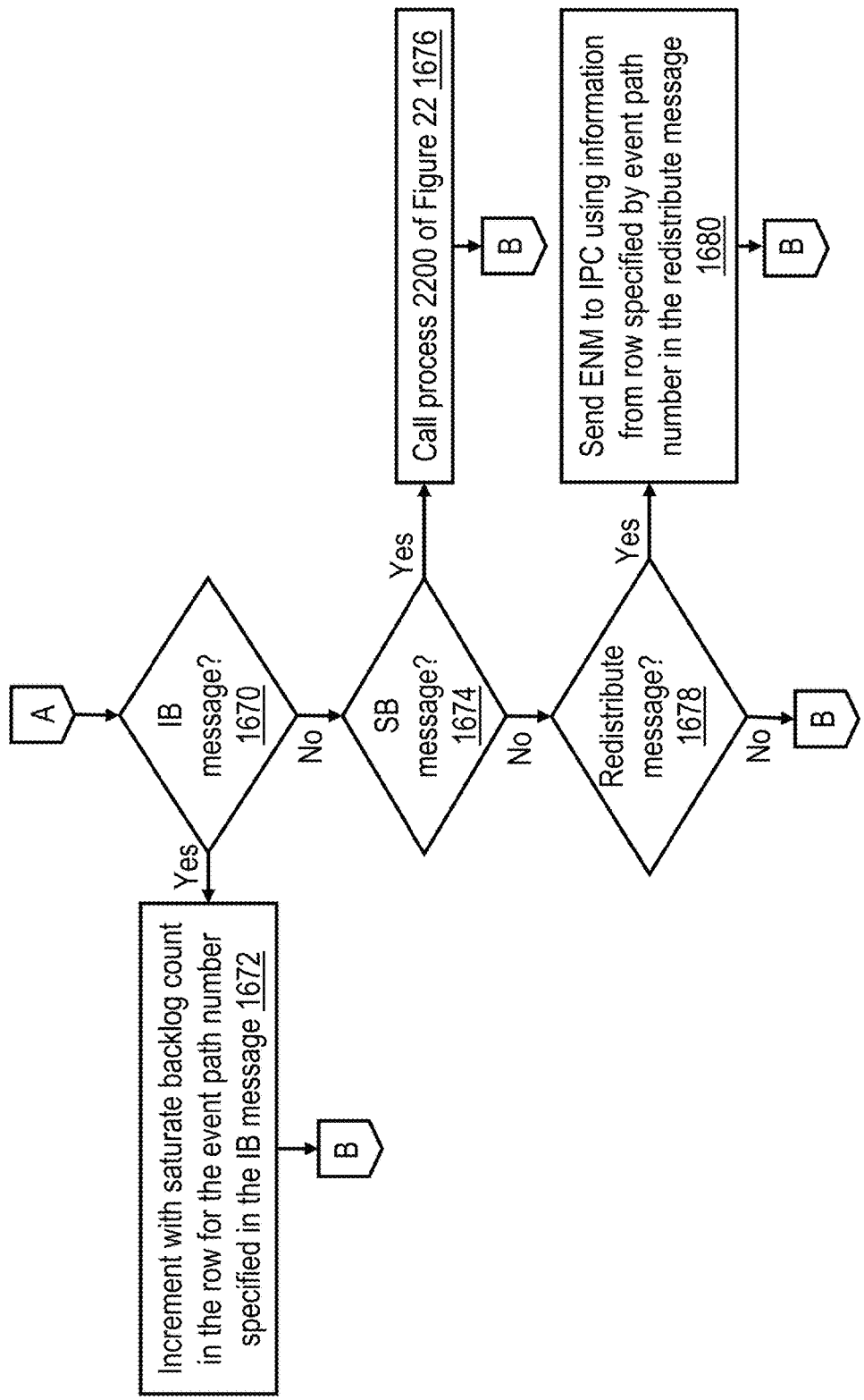

With reference to FIGS. 16D and 16E an exemplary process 1650 is illustrated that is implemented by IRC 260 to handle interrupts. Process 1650 may, for example, be initiated in block 1652 when IRC 260 receives input via memory I/O bus 210. Next, in decision block 1654, IRC 260 determines whether the received input corresponds to an event routing message (ERM) 1206. In response to the received input not corresponding to an ERM 1206 in block 1654 control transfers to decision block 1670 (see FIG. 16E). In response to the received input being an ERM 1206 in block 1654 control transfers to block 1656. In block 1656, IRC 260 selects a row in event notification descriptor table (ENDT) 1460 per a value of the 'event path number' field of ERM 1206. Next, in block 1658, IRC 260 stores a generation bit and event source number (from ENDT 1460) in an interrupt destination buffer (IDB) associated with the event path number (i.e., at an address and offset count specified by the address 'Addy' field and offset counter 'Offset Ctr' field of ENDT 1460). As one example, IDBs may be allocated in main memory or another memory associated with IRC 260. The generation bit is used to track whether an associated IDB, which in one embodiment is implemented as a circular buffer, has been completely traversed.

Then, in block 1660, IRC 260 increments the offset counter for the IDB modulo the length of the IDB (size field of ENDT 1460), i.e., to point to a next entry in the IDB, in ENDT 1460. Then, in decision block 1662, IRC 260 determines whether the offset counter has wrapped. In response to the offset counter wrapping in block 1662 control transfers to block 1664. In block 1664 IRC 260 changes the polarity of the IDB generation bit in ENDT 1460. Next, in block 1666, IRC 260 builds an event notification message (ENM) 1202 based on associated information in ENDT 1460. In response to the offset counter not wrapping in block 1662 control transfers to block 1666. Following block 1666 control transfers to block 1668, where IRC 260 sends an ENM 1202 to IPC 240 via memory I/O bus 210. Next, control transfers from block 1668 to block 1654.

As previously mentioned, in response to the received input not corresponding to an ERM 1206 in block 1654, process 1650 passes through page connector A to block 1670 (see FIG. 16E). In block 1670 IRC 260 determines whether the received input corresponds to IB message 1224. In response to the received input corresponding to IB message 1224 in block 1670 control transfers to block 1672. In block 1672 IRC 260 increments the 'backlog count' (assuming a value provided in an associated 'saturate' field is not exceeded) in a row of ENDT 1460 that corresponds to the event path number specified in IB message 1224 to indicate that another interrupt has been buffered. The value of the saturate field indicates the number of VP threads in an associated group that are potentially available to service an interrupt and is used to limit the number of spurious interrupts (i.e., interrupts that cannot be serviced due to a lack of available VP threads). For example, assuming four available VP threads in a group then the saturate value is set equal to four. Following block 1672 control returns through page connector B to block 1654. In response to the received input not corresponding to IB message 1224 in block 1670 control transfers to decision block 1674.

In block 1674 IRC 260 determines whether the received input corresponds to SB message 1236. In response to the received input corresponding to SB message 1236 in block 1674 control transfers to block 1676, where IRC 260 calls process 2200 of FIG. 22 (which is discussed in detail below). When control returns from process 2200, the process proceeds from block 1676 through page connector B to block 1654. In response to the received input not corresponding to SB message 1236 in block 1674 control transfers to decision block 1678. In block 1678 IRC 260 determines whether the received input corresponds to redistribute message 1234. In response to the received input not corresponding to redistribute message 1234 in block 1678 control transfers through page connector B to block 1654. In response to the received input corresponding to redistribute message 1234 in block 1678 control transfers to block 1680. In block 1680 IRC 260 issues an ENM 1202 to IPC 240 using information from a row in ENDT 1460 that is specified by the event path number in redistribute message 1234. Following block 1680 control returns through page connector B to block 1654.

Figure 17:
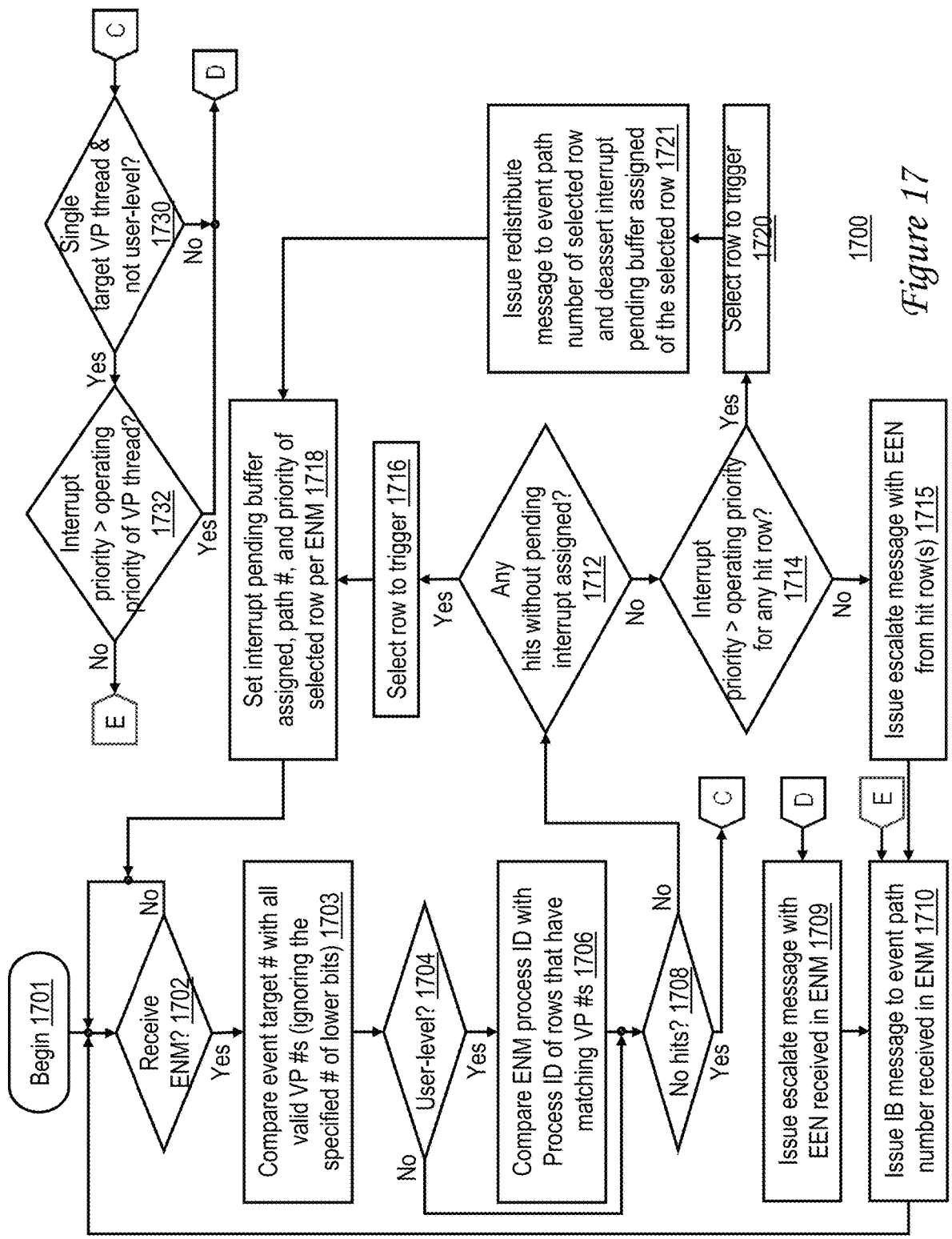
FIG. 17 is a flowchart of an exemplary process implemented by an IPC, configured according to the present disclosure, to handle interrupts.

With reference now to FIG. 17, an exemplary process 1700 is illustrated that can be implemented by IPC 240 to handle interrupts. It should be appreciated that IPC 240 handles event notification messages differently from how IPC 540 handles event notification messages (see FIG. 7). Process 1700 is initiated in block 1701, for example, when IPC 240 receives input via memory I/O bus 210. Next, in decision block 1702, IPC 240 determines whether an ENM 1202 was received. It should be appreciated that ISC 224 operates differently from ISC 424 (see FIG. 6) in that ISC 224 builds ERMs 1206 (as contrasted with ENMs 302) that are sent to IRC 260, and IRC 260 builds an ENM 1202 (responsive to an ERM 1206) that is sent to IPC 240. In contrast to ENM 302, ENM 1202 includes an additional 'process ID' field, an additional 'level' field, an additional 'number of bits to ignore' field, an 'escalate event number' field, an 'event path number' field replaces the 'event source number' field, and the 'event target number' field provides a virtual processor (VP) thread number instead of a physical processor (PP) thread number. In response to the received input not corresponding to an ENM 1202, process 1700 loops on block 1702. In response to the input received at block 1702 corresponding to an ENM 1202, process 1700 proceeds to block 1703.

In block 1703, IPC 240 compares the 'event target number' from ENM 1202 with all valid VP numbers, ignoring the number of lower-order bits specified (in the 'number of bits to ignore' field) by ENM 1202. Next, in decision block 1704, IPC 240 determines whether the 'level' field indicates that the interrupt is a user-level interrupt. In response to the interrupt being a user-level interrupt, control transfers from block 1704 to block 1706. At block 1706, IPC 240 compares the 'process ID' of ENM 1202 with 'process IDs' of rows in ICT 242*c* with matching valid VP numbers. From block 1706, process 1700 proceeds to decision block 1708. In response to the interrupt not being a user-level interrupt in block 1704, control transfers directly to block 1708.

Block 1708 depicts IPC 240 determining whether or not a hit occurred for at least one VP thread. If so, process 1700 proceeds from block 1708 to block 1712, which is described below. In response to a determination at block 1708 of no hits in ICT 242 (i.e., no VP threads being available to be interrupted due to no VP thread being valid that meets the VP selection criteria (e.g., specified in the 'event target number' field and the 'number of bits to ignore' field) with the specified process ID for a user-level interrupt), process 1700 proceeds from block 1708 through page connector C to blocks 1730-1732.

Blocks 1730-1732 illustrate IPC 240 providing intelligent hardware-based control of interrupt escalation. In particular, before permitting escalation, IPC 240 checks VPT 244 to determine whether or not the interrupt priority is sufficient to support escalation (thus applying conditional escalation) rather than escalating an interrupt unconditionally and then have the hardware subsequently detect that the interrupt cannot be served at the escalated priority. Thus, in the depicted embodiment, IPC 240 determines at block 1730 whether or not the interrupt targets a single virtual processor thread and is not a user-level interrupt. If not, process 1700 proceeds through page connector D to block 1709, which is described below. If an affirmative determination is made at block 1730, IPC 240 additionally determines at block 1732 by reference to VPT 244 if the relevant interrupt has an escalated priority that is greater than the operating priority specified for the virtual processor thread in VPT 244. If not, process 1700 proceeds through page connector E to block 1710 without granting the requested escalation of the interrupt. If, however, IPC 240 makes an affirmative determination at block 1732, process 1700 proceeds through page connector D to block 1709, representing a hardware-based decision to escalate the interrupt.

At block 1709, IPC 240 issues an escalate message 1204 (to escalate the interrupt to a next higher software stack level, assuming a higher level is available) with an associated escalate event number (EEN), sourced by IRC 260 in ENM 1202. Next, in block 1710, IPC 240 issues IB message 1224 to an event path number received in ENM 1202 (to cause IRC 260 to increment the 'backlog count' field for a row of ENDT 1460 associated with the event path number). From block 1710 control returns to block 1702. In response to at least one hit occurring in block 1708 control transfers to decision block 1712, where IPC 240 determines whether there are any hits that do not have a pending interrupt already assigned.

In response to IPC 240 determining that there is at least one hit that does not already have a pending interrupt assigned in block 1712, control transfers to block 1716. In block 1716, IPC 240 selects (e.g., based on 'preferred' bits 1511 from appropriate rows (sourced from a 'preferred' field of ICT 242) and may also utilize event priority' relative to 'operating priority', least recently used (LRU), and/or random, etc. in the event that multiple 'preferred' bits 1511 are asserted) a row in ICT 242 to trigger an interrupt. Next, in block 1718, IPC 240 asserts an 'assigned' field (to indicate an interrupt is pending), and sets an 'event path number' field and an 'event priority' field of the selected row per ENM 1202. Following block 1718 control returns to block 1702. In response to IPC 240 determining that there are no hits that do not already have a pending interrupt assigned in block 1712 control transfers to decision block 1714. In block 1714, IPC 240 determines whether an interrupt priority (i.e., the event priority) of ENM 1202 is greater than an operating priority of any row with a hit that has a pending interrupt.

In response to the interrupt priority not being greater than an operating priority of any row with a hit that has a pending interrupt, process 1700 proceeds from block 1714 to block 1715, where IPC 240 issues an escalate message 1204 with an associated EEN sourced from an appropriate row or rows of an appropriate ICT 242. From block 1715 control then transfers to block 1710 and then to block 1702. In response to the interrupt priority being greater than an operating priority of at least one row with a hit that has a pending interrupt control transfers from block 1714 to block 1720. In block 1720, IPC 240 selects (e.g., based on 'preferred' bits 1511 from appropriate rows (sourced from a 'preferred' field of ICT 242) and may also utilize event priority' relative to 'operating priority', least recently used (LRU), and/or random, etc. in the event that multiple 'preferred' bits 1511 are asserted) a row in ICT 242 to trigger an interrupt. Next, in block 1721, IPC 240 issues redistribute message 1234 to an event path number of the selected row (to indicate the pending interrupt needs to be reassigned to a different VP thread) and deasserts (clears) an interrupt pending buffer assigned (i.e., the 'assigned' field) of the selected row. From block 1721 process 1700 passes to block 1718 and then to block 1702.

Figure 18A:
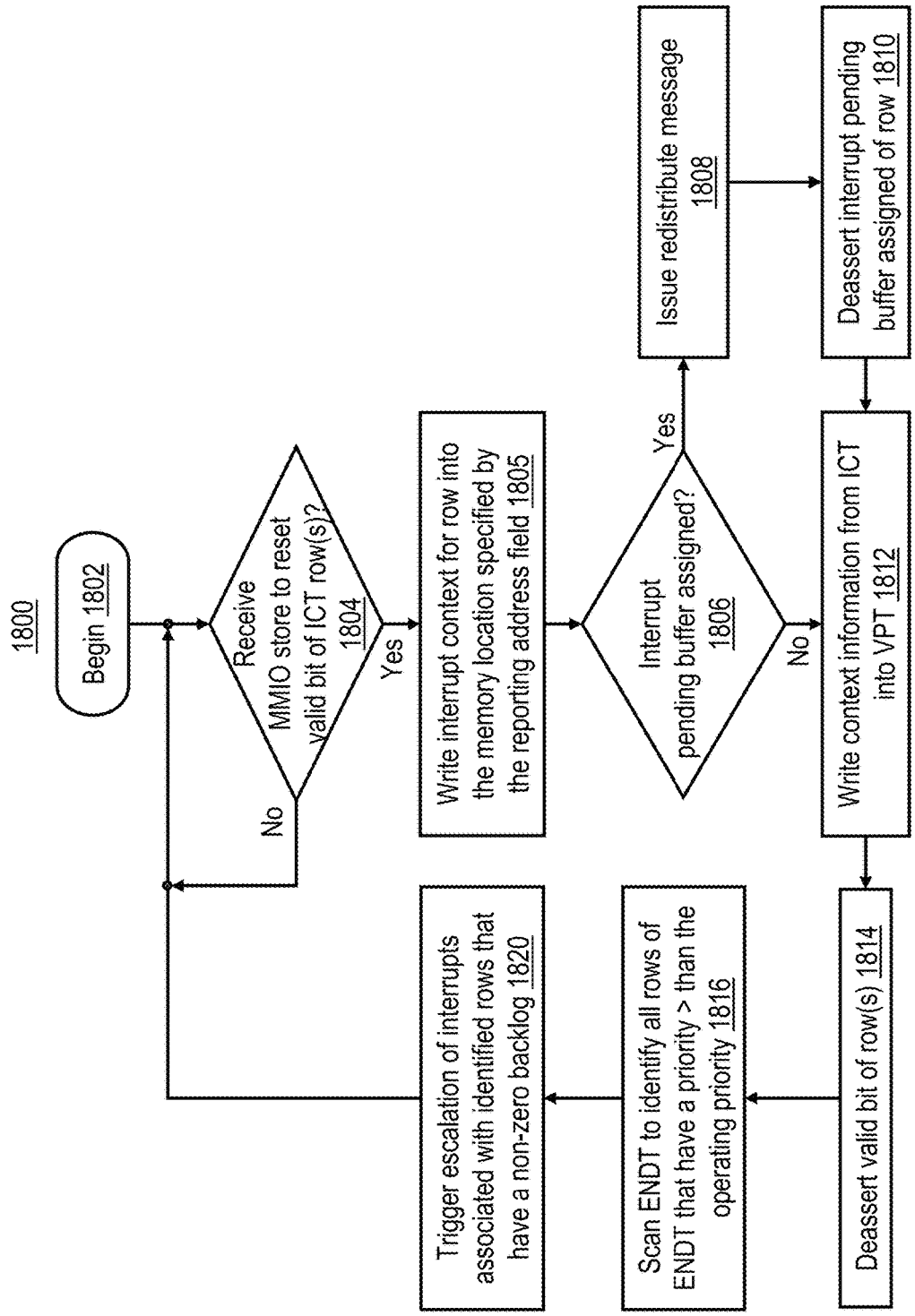
FIG. 18A is a flowchart of another exemplary process implemented by an IPC, configured according to the present disclosure, to handle interrupts.

With reference to FIG. 18A an exemplary process 1800 is illustrated that can be implemented by IPC 240 to handle certain MMIO stores received from a processor core. As one example, a processor core 200 may issue a MMIO store to IPC 240 to invalidate all associated VPs. Process 1800 is initiated in block 1802 when, for example, IPC 240 receives a MMIO store from a given processor core 200. Next, in decision block 1804, IPC 240 determines whether the MMIO store is directed to deasserting (resetting) a valid bit in one or more rows in ICT 242. In response to the received MMIO store not being directed to deasserting a valid bit in one or more rows in ICT 242, control loops on block 1804. In response to the received MMIO store being directed to deasserting a valid bit in one or more rows in ICT 242, process 1800 passes from block 1804 to block 1805. At block 1805, IPC 240 (or more specifically, context writer 1566) writes interrupt context information for an associated row or rows in ICT 242 into a memory location or locations specified by a value or values in a 'reporting address' field of an associated row or rows in ICT 242. Next, in decision block 1806, IPC 240 determines whether the interrupt pending buffer is assigned (i.e., whether the 'assigned' field indicates that an interrupt is currently assigned to the row whose valid bit is to be deasserted). In response to a determination at block 1806 that the interrupt pending buffer is not assigned, process 1800 passes directly from block 1806 to block 1812, which is described below. In response to a determination at block 1806 that the interrupt pending buffer is assigned, process 1800 passes from block 1806 to block 1808.

Block 1808 depicts IPC 240 issuing a redistribute message 1234 for the interrupt that was pending (to facilitate reassignment of the pending interrupt that was preempted). In addition, IPC 240 deasserts the interrupt pending buffer 'assigned' field of the row(s) of ICT 242 (block 1810) and writes context information for the pre-empted interrupt(s) from ICT 242 into VPT 244 (block 1812). In particular, IPC 240 moves the 'process ID', the 'operating priority', the 'escalate event no.', and the 'preferred' fields from the selected ICT row(s) into their associated VPT row(s). In addition, IPC 240 deasserts the valid bit for each of the specified row or rows in ICT 242 (block 1814). IPC 240 also scans all of the rows of ENDT 1460 to identify those ENDT rows specifying an event (interrupt) priority (in the 'event priority' field) greater than the operating priority specified in each of the row(s) written into VPT 244 (block 1816). IPC 240 then triggers escalation of all interrupts associated with the identified ENDT rows having a non-zero backlog (e.g., as indicated by a non-zero value in the relevant 'backlog count' field) by issuing escalate message(s) 1204 (block 1820). Following block 1820, process 1800 returns to block 1804, which has been described.

Figure 18B:
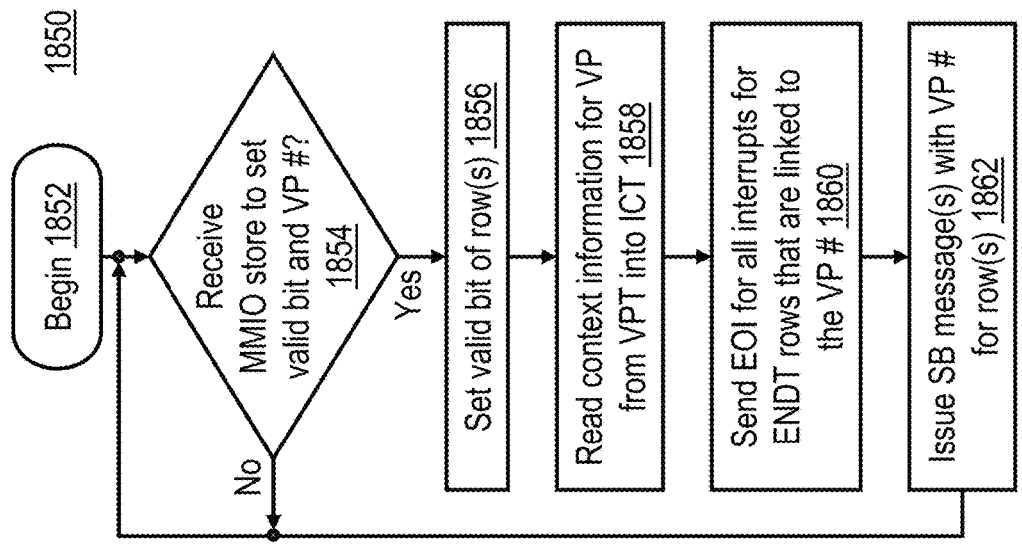
FIG. 18B is a flowchart of another exemplary process implemented by an IPC, configured according to the present disclosure, to handle interrupts.

With reference to FIG. 18B an exemplary process 1850 is illustrated that can be implemented by IPC 240 to handle certain MMIO stores received from a processor core. For example, a processor core 200 may issue a MMIO store to IPC 240 to validate one or more virtual processor threads. Process 1850 is initiated in block 1852, for example, in response to IPC 240 receiving a MMIO store from a given processor core 200. Next, in decision block 1854, IPC 240 determines whether the MMIO store is directed to asserting (setting) a valid bit and virtual processor thread number (i.e., VP #) in one or more rows in ICT 242. In response to the received MMIO store not being directed to asserting a valid bit and setting the VP # in one or more rows in ICT 242, process 1850 loops on block 1854. In response to a determination that the received MMIO store is directed to asserting a valid bit and setting the VP # in one or more rows in ICT 242, process 1850 proceeds from block 1854 to block 1856. In block 1856 IPC 240 asserts the valid bit for the row or rows in ICT 242. In addition, at block 1858, IPC 240 reads the context information for the specified VP thread from VPT 244 into ICT 242 (block 1858). In particular, IPC 240 moves the 'process ID', the 'operating priority', the 'escalate event no.', and the 'preferred' fields from the selected VPT row(s) into their associated ICT row(s). IPC 240 also sends an EOI message 306 on memory I/O bus 210 to ISC 224 for all interrupts associated with rows in ENDT 1460 linked to the specified VP #. The EOI messages 306 are handled by ISC 224 as described above with reference to FIG. 16C. At block 1862 IPC 240 issues SB message 1236 per the VP # for the row that is now valid in ICT 242 to determine whether there are any pending interrupts for the VP thread that may now be serviced by the VP thread. Following block 1862, process 1850 returns to block 1854.

Figure 19:
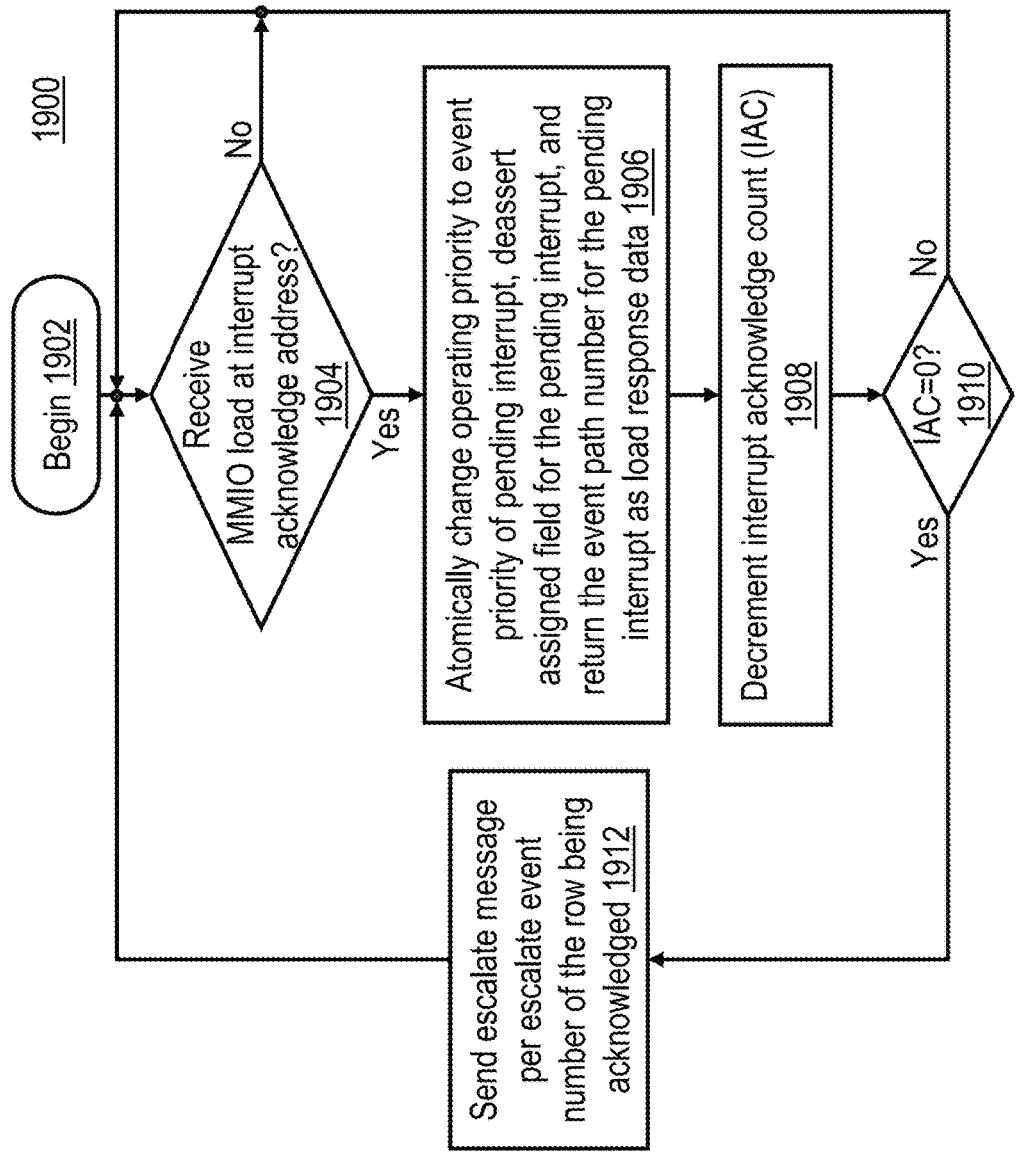
FIG. 19 is a flowchart of still another exemplary process implemented by an IPC, configured according to the present disclosure, to handle interrupts.

With reference to FIG. 19, an exemplary process 1900 implemented by IPC 240 to handle interrupts is illustrated. It should be appreciated that process 1900 is different than process 1000 implemented by IPC 540 (see FIG. 10). Process 1900 may be periodically executed by IPC 240 to determine whether IPC 240 has received a communication (e.g., a MMIO load or a MMIO store) from a processor core with respect to a pending interrupt. Process 1900 is initiated in block 1902 at which point control transfers to decision block 1904. In block 1904 IPC 240 determines whether a MMIO load has been received at an interrupt acknowledge address. In response to a MMIO load not being received at the interrupt acknowledge address control loops on block 1904. In response to a MMIO load being received at the interrupt acknowledge address control transfers from block 1904 to block 1906. In block 1906 IPC 240 atomically changes an operating priority of the acknowledged interrupt to the event priority of the pending interrupt, deasserts (resets) the assigned field for the interrupt in ICT 242, and returns the event path number of the pending interrupt as response data to the MMIO load.

Next, in block 1908, IPC 240 decrements an interrupt acknowledge count (IAC). As previously mentioned, the 'IAC' field specifies a current IAC that is used to determine whether an associated VP thread has been interrupted too often. In one or more embodiments, the IAC is decremented when the associated VP thread is interrupted and may be periodically incremented while the associated VP thread is dispatched to implement a rate instrument. Then, in decision block 1910, IPC 240 determines whether the IAC is equal to zero (or alternatively some other threshold level). In response to the IAC not being equal to zero control transfers from block 1910 to block 1904. In response to the IAC being equal to zero control transfers from block 1910 to block 1912. In block 1912 IPC 240 sends an escalate message to ISC 224 per the escalate event number of the row of ICT 242 that is being acknowledged to provide relief for the VP thread that has been interrupted too often. From block 1912 control returns to block 1904. While process 1900 is described as being implemented using a count-down approach, it should be appreciated that a similar process may be implemented using a count-up approach. It should also be appreciated that the threshold level and/or the IAC may be periodically modified to implement a rate instrument. As one example, the IAC may be periodically incremented and the threshold level may be maintained at a fixed value to implement a rate instrument.

With reference to FIG. 20 an exemplary process 2000 is illustrated that is implemented by a processor core, configured according to the present disclosure, to handle interrupts. Process 2000 is initiated in block 2002 in response to, for example, processor core 200 determining that a virtual processor thread is to be preempted, e.g., such that a higher priority interrupt can be serviced, and that a state of the preempted virtual processor thread should be saved. Then, in block 2004, processor core 200 deasserts (resets) an exception enable bit (e.g., maintained in an internal processor register). As previously mentioned, processor core 200 masks interrupts by deasserting an associated exception enable bit.

Next, in block 2006, processor core 200 determines whether or not IPC 240 is presently configured to provide hardware-controlled reset of the escalation paths of all rows in ENDT 1460 targeting the preempted virtual processor thread, as described above with reference to FIG. 18A. The determination illustrated at block 2006 can be made, for example, by reference to a predetermined register or memory address storing system configuration information. In response to an affirmative determination at block 2006, process 2000 passes directly to block 2010, which is described below. In response to a negative determination at block 2006, processor core 200 issues an EOI message 306 to all rows in EATs 226 used for escalation of rows in ENDT 1460 targeting the preempted virtual processor thread (block 2008). Process 2000 then passes to block 2010, which illustrates processor core 200 also issuing a MMIO store to IPC 240 to deassert (reset) the VP thread valid bit and cause context information in an associated row of ICT 242 to be pulled into a VP context save area in memory. In one or more embodiments, the MMIO store triggers a direct memory access (DMA) transfer (by context writer 1566) of information in the associated row of ICT 242 to a location specified by a value in a 'reporting address' field of the associated row. From block 2010, process 2000 proceeds to block 2012, at which process 2000 terminates.

With reference to FIG. 21, an exemplary process 2100 is illustrated that is implemented by a processor core, configured according to the present disclosure, to handle interrupts. Process 2100 is initiated at block 2102, for example, in response to processor core 200 determining that a virtual processor thread requires dispatching. Then, in block 2104, processor core 200 deasserts (resets) an associated exception enable bit (e.g., maintained in an internal processor register). It should be appreciated that processor core 200 masks interrupts by deasserting the exception enable bit. Then, in block 2108, processor core 200 issues a MMIO store to assert (set) the VP thread valid bit in the entry in ICT 242 and to set the VP thread number (VP #) in that entry. Then, in block 2112 processor core 200 atomically asserts (sets) the exception enable bit and returns control flow to the interrupted program. From block 2112 control transfers to block 2114, where process 2100 terminates.

Figure 22:
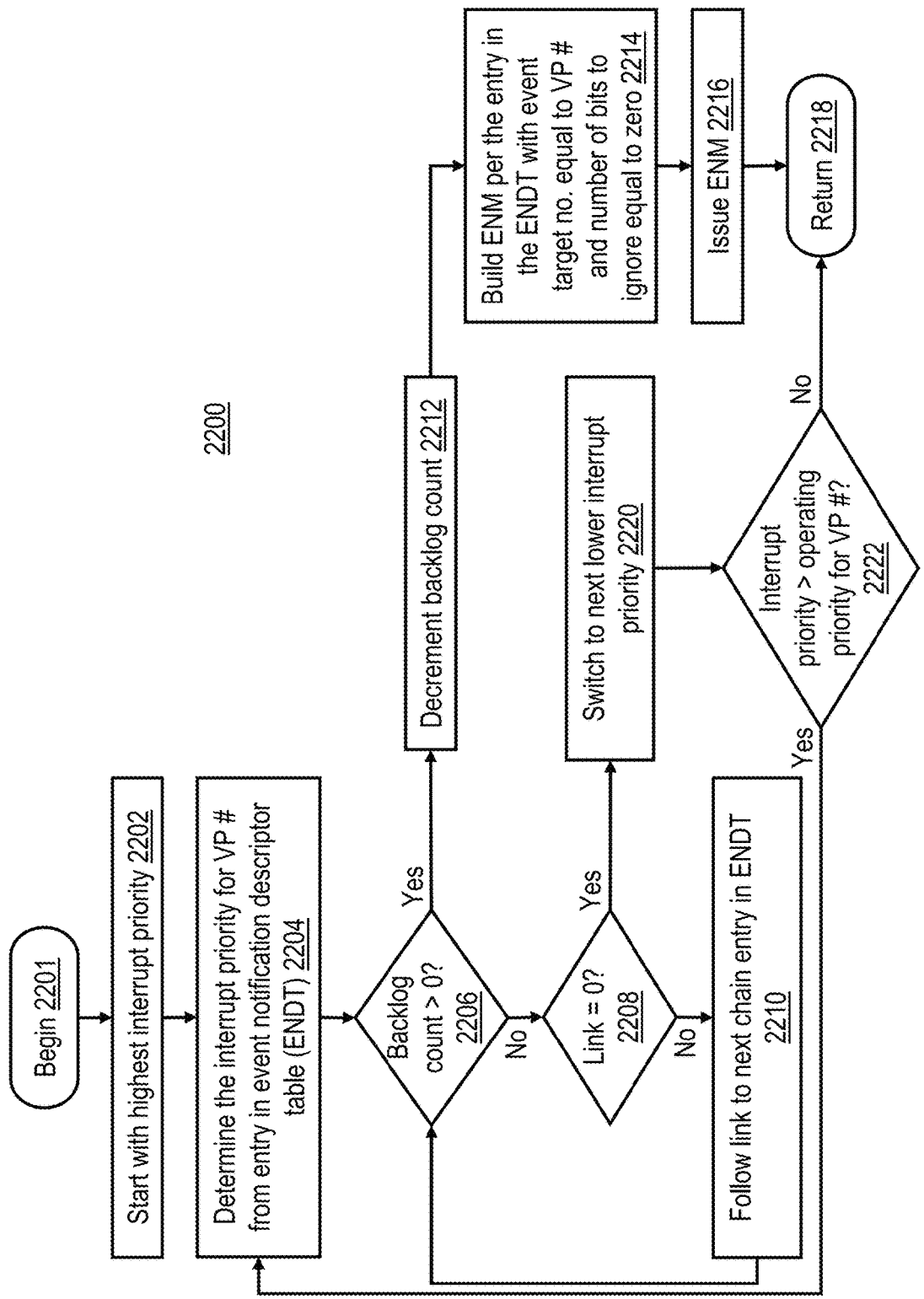
FIG. 22 is a flowchart of an exemplary process implemented by an IRC, configured according to the present disclosure, to handle interrupts.

With reference to FIG. 22, a scan backlog (SB) process 2200 (which is called by process 1650, see FIGS. 16D and 16E) that is executed by IRC 260 is further illustrated according to an embodiment of the present disclosure. SB process 2200 is initiated in block 2201 in response to, for example, IRC 260 receiving SB message 1236 from IPC 240. In one or more embodiments, rows of ENDT 1460 (i.e., corresponding to event path numbers) are allocated by VP # and priority. For example, assuming there are sixteen different VP threads then sixteen rows, one for each VP thread, are allocated for the VP threads with the priority for each VP thread being specified by the 'event priority' field. As another example, assuming there are sixteen different VP threads each having two different possible priorities then thirty-two rows, two for each VP thread, are allocated for the VP threads with the priority for each VP thread being specified by the 'event priority' field. In one or more embodiments, rows of ENDT 1460 above a maximum VP # are allocated to event path numbers associated with groups of VP threads. In at least one embodiment, a 'link' field in each row of ENDT 1460 specifies an event path number associated with a next higher grouping at the same priority. When a value of the link field of ENDT 1460 is zero an end-of-chain is indicated.

Next, in block 2202, IRC 260 begins with the highest interrupt priority, which corresponds to a first event path for the VP thread. As previously mentioned, event paths are allocated one block of event paths for each VP thread, and within each block one event path for each implemented priority. By starting with the event path for the highest priority, the scan starts with the highest priority event path, checking to see if there is a backlog of work (IDB entries) to be signaled using an interrupt. If there is a backlog of work for a given event path (as indicated, for example, by a non-zero value in the relevant 'backlog count' field), the 'backlog count' field for the event path is decremented, and an interrupt is signaled. If there is not a backlog of work, the scan continues down the chain link to determine if there is work pending in one of the other event paths at the same priority (i.e., ever larger groupings of VP threads). If not (i.e., an end-of-chain is indicated), the scan continues to the next lower priority (next event path in the block of event paths for the VP thread) until all the chains for event paths of higher priority than the operating priority of the VP thread have been scanned. In block 2204, IRC 260 determines the event priority for the VP # specified in the SB message 1236 from an associated entry in ENDT 1460. Next, in decision block 2206, IRC 260 determines whether the backlog count (specified in the 'backlog count' field) for the associated entry in the ENDT 1460 is greater than zero. In response to the backlog count for the associated entry in the ENDT 1460 being greater than zero, control transfers from block 2206 to block 2212. In block 2212 IRC 260 decrements the backlog count to indicate that one less interrupt is currently outstanding for the specified VP thread and priority. Next, in block 2214, IRC 260 build an ENM 1202 using the VP # for the 'event target number' and the 'number of bits to ignore' field set equal to zero. Then, in block 2216, IRC 260 issues ENM 1202 built in block 2214 to IPC 240 on memory I/O bus 210. Following block 2216 control transfers to block 2218 where process 2200 returns control to process 1650 (see FIGS. 16D and 16E).

Returning to block 2206, in response to the backlog count for the associated entry in ENDT 1460 not being greater than zero, control transfers to decision block 2208. In block 2208 IRC 260 determines whether the 'link' field is equal to zero (i.e., whether an end-of-chain has been reached) for the associated entry in the ENDT 1460. In response to the 'link' field not being equal to zero in block 2208 control transfers to block 2210. In block 2210 IRC 260 uses a value of the 'link' field in the associated entry in ENDT 1460 to locate a next entry in ENDT 1460 for the IDB chain. From block 2210 control returns to block 2206. In response to the 'link' field being equal to zero in block 2208 control transfers to block 2220. In block 2220 IRC 260 switches to a linked list of entries in ENDT 1460 that points to a next lower interrupt priority. Then, in block 2222, IRC 260 determines whether the next lower interrupt priority is greater than the operating priority for the VP # specified in SB message 1236. In response to the next lower interrupt priority being greater than the operating priority for the VP # specified in SB message 1236 in block 2222 control transfers to block 2204. In response to the next lower interrupt priority not being greater than the operating priority for the VP # specified in SB message 1236 in block 2222 control transfers to block 2218.

Figure 23:
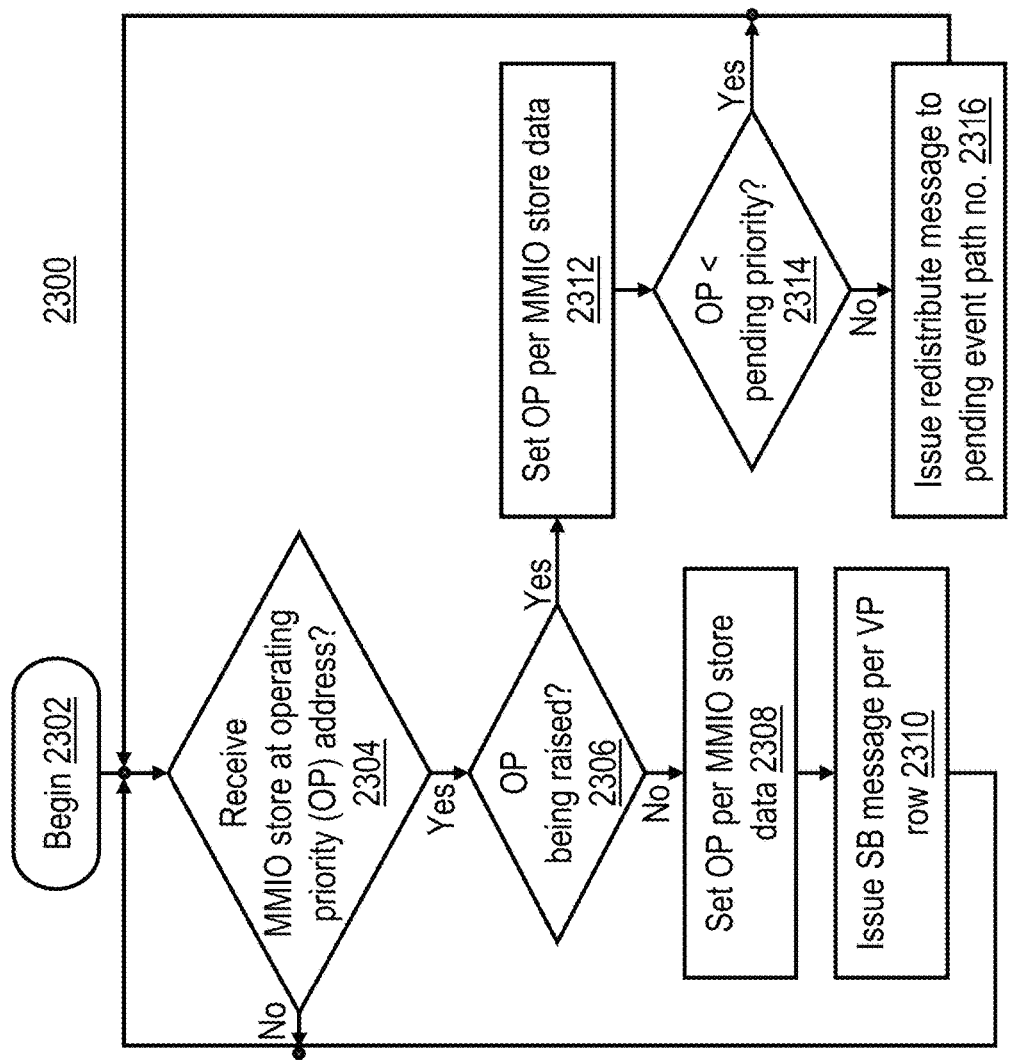
FIG. 23 is a flowchart of an exemplary process implemented by an IPC, configured according to the present disclosure, to handle interrupts.

With reference to FIG. 23 an exemplary process 2300 is illustrated that is implemented by IPC 240 to handle a change in operating priority. Process 2300 is initiated in block 2302 when, for example, IPC 240 receives a MMIO operation from a given processor core 200. Next, in decision block 2304, IPC 240 determines whether a MMIO store has been received at an operating priority address. In response to not receiving a MMIO store at the operating priority address control loops on block 2304. In response to receiving a MMIO store at the operating priority address control transfers from block 2304 to decision block 2306. In block 2306 IPC 240 determines whether an operating priority is being raised. In response to the operating priority being raised in block 2306 control transfers to block 2312. In block 2312 IPC 240 sets the operating priority per data associated with the MMIO store. Next, in decision block 2314, IPC 240 determines whether the operating priority is less than the priority of a pending interrupt. In response to the operating priority being less than the priority of a pending interrupt control transfers from block 2314 to block 2304. In response to the operating priority not being less than the pending priority in block 2314 control transfers to block 2316. In block 2316 IPC 240 issues redistribute message 1234 with the event path number for the pending interrupt that is being preempted. From block 2316 control returns to block 2304.

In response to the operating priority not being raised in block 2306 control transfers to block 2308, where IPC 240 sets the operating priority per data associated with the MMIO store. Next, in block 2310, IPC 240 issues an SB message with a VP # from the row of ICT 242 in which the operating priority remained the same or was lowered to determine if a buffered interrupt associated the VP thread can now be serviced. Following block 2310 control returns to block 2304.

Figure 24:
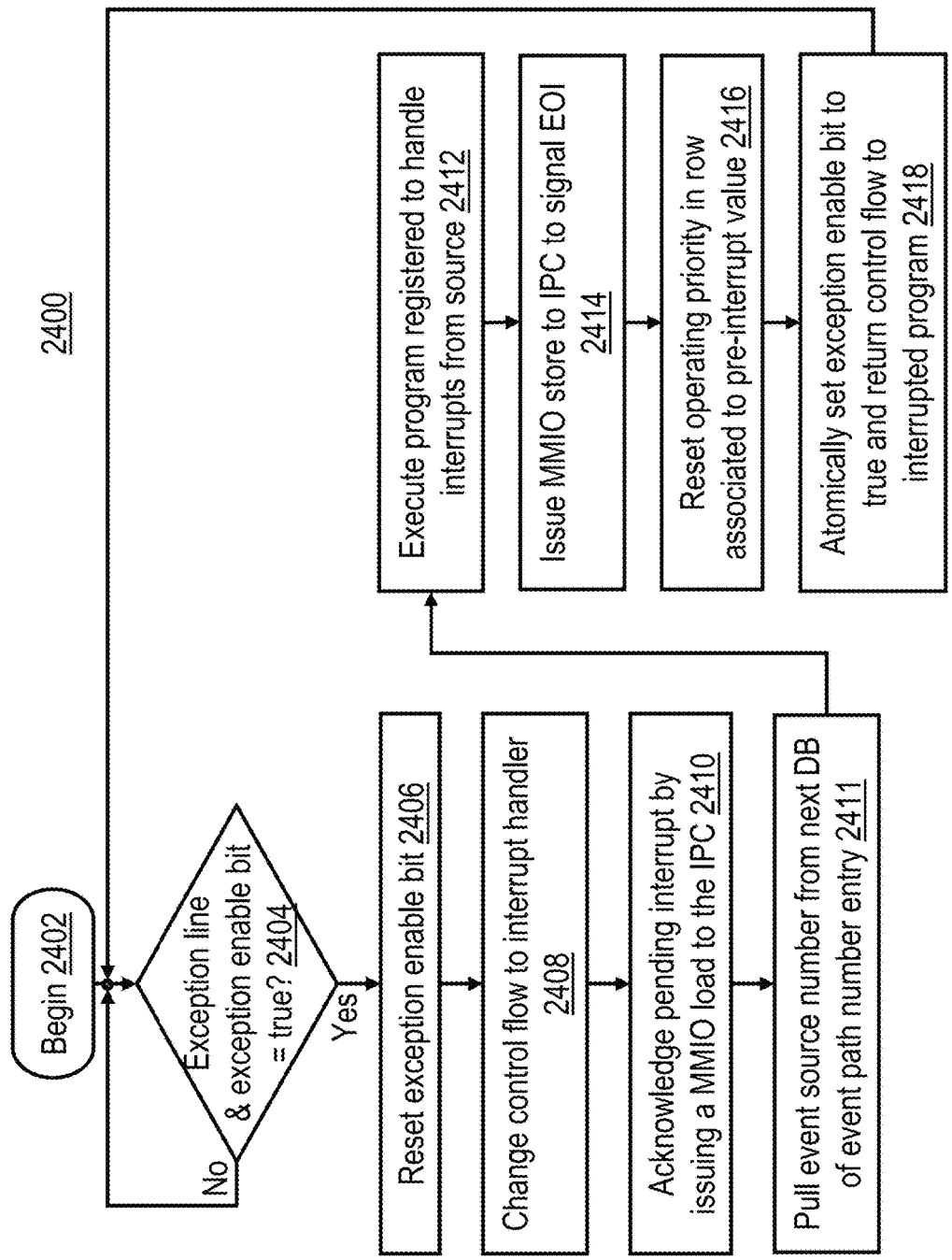
FIG. 24 is a flowchart of an exemplary process implemented by a processor core, configured according to the present disclosure, to handle interrupts.

With reference to FIG. 24, an exemplary process 2400 that is implemented by a processor core to handle interrupts is illustrated. It should be appreciated that each processor core maintains an exception enable bit (e.g., in an internal processor register) for each associated exception line. Process 2400 may be periodically executed by a processor core to determine whether a physical processor thread should be interrupted to facilitate executing, by the processor core, an interrupt handler to service an interrupt. Process 2400 is initiated in block 2402 at which point control transfers to decision block 2404. In block 2404 the processor core determines whether both an exception line and an exception enable bit are asserted (i.e., true or set). As previously mentioned, a processor core masks interrupts by deasserting the exception enable bit.

In response to the exception line and/or the associated exception enable bit not being asserted control loops on block 2404. In response to both the exception line and the associated exception enable bit being asserted control transfers from block 2404 to block 2406. In block 2406 the processor core deasserts (resets) the exception enable bit (to prevent subsequent interrupts from interrupting the current interrupt). Next, in block 2408, the processor core changes control flow to an appropriate interrupt handler. Then, in block 2410, the processor core acknowledges the pending interrupt by issuing a MMIO load to IPC 240. In response to the MMIO load, IPC 240 returns the event path number field of the row of ICT 242 that corresponds to the physical processor thread and atomically, in the same row, sets the operating priority to the value of the event priority and resets the assigned field. Next, in block 2411, the processor core pulls the event source number from the next DB of the event path number entry. Then, in block 2412, the processor core executes a program that is registered to handle interrupts from the source (specified by a value in the 'event source number' field).

Next, in block 2414, following completion of the program, the processor core issues a MMIO store to IPC 240 to signal an EOI. Then, in block 2416, the processor core, resets the operating priority in the row in ICT 242 that is associated with the physical processor thread to a pre-interrupt value. Next, in block 2418, the processor core atomically asserts the exception enable bit and returns control flow to a program that was interrupted to service the interrupt. Following block 2418 control returns to block 2404.

Figure 25A:
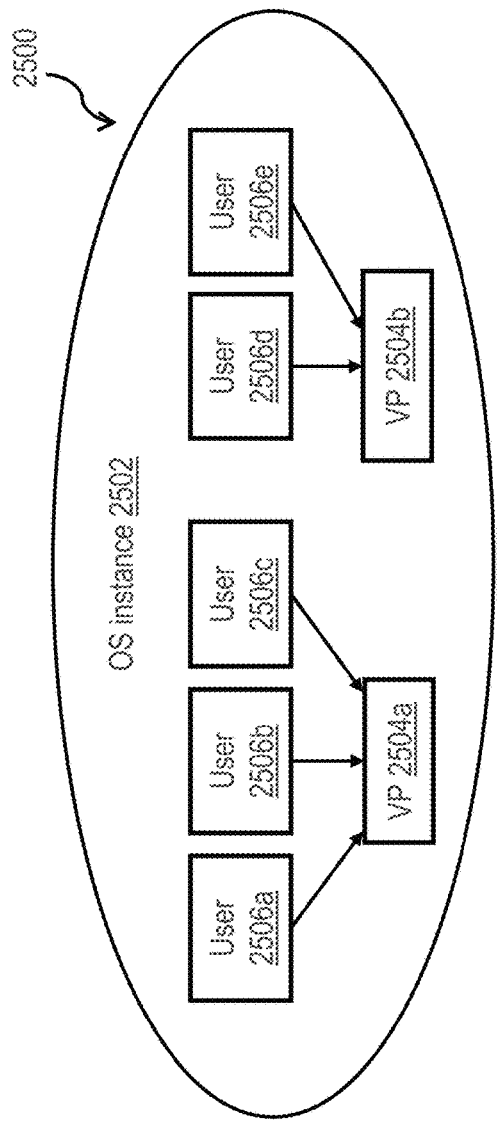
FIGS. 25A-25B illustrate the adaptation of an interrupt escalation path in a virtualized processing environment in accordance with one embodiment.
Figure 25B:
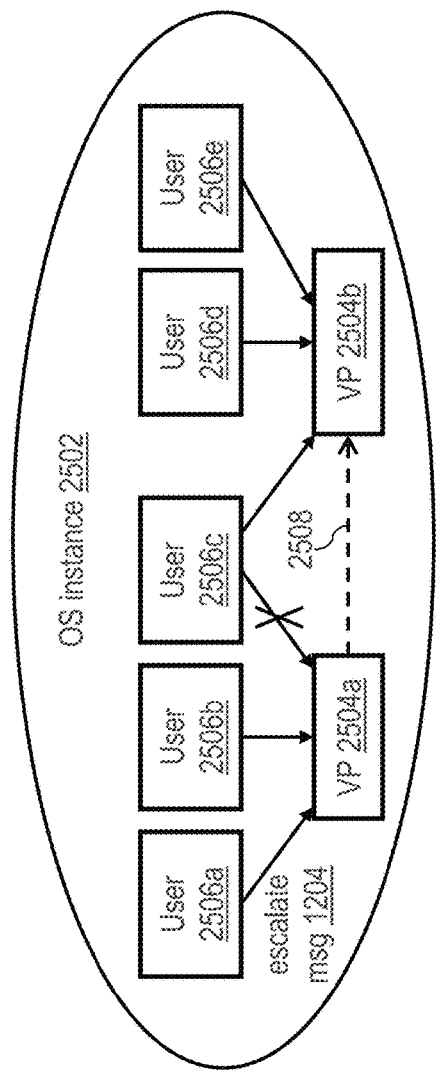

With reference now to FIGS. 25A-25B, there is illustrated an example of the adaptation of an interrupt escalation path in a virtualized processing environment 2500 in accordance with one embodiment. In virtualized processing environment 2500, a core 200 of a processing unit 104 executes an operating system (OS) instance 2502. OS instance 2502 may include a multiplicity of virtual processors including virtual processors 2504a and 2504b. As shown in FIG. 25A, virtual processor 2504a initially executes user-level threads including user-level threads 2506a-2506c, and virtual processor 2504b initially executes user-level threads including user-level threads 2506d-2506e.

OS instances such as OS instance 2502 frequently move user-level threads 2506 between virtual processors 2504 to promote load balancing. For example, OS instance 2502 may move user-level thread 2506c from virtual processor 2504a to virtual processor 2504b, as generally shown in FIG. 25B. One consequence of the movement of user-level thread 2506c to run under a different virtual processor 2504b is that the escalation path utilized to handle an escalate message 1204 targeting the migrated user-level thread 2506c must be re-routed.

One possible design option for re-routing the escalation path, shown in FIG. 25B at reference numeral 2508, is to have OS instance 2502 manage re-routing the escalation path through VP-to-VP communication. This design option generates additional overhead for OS instance 2502 as more user-level threads 2506 are moved from their initial VP location. In practice, security concerns may dictate that the update of the interrupt-related data structures initiated by an OS instance 2502 require invocation of the hypervisor in order to protect the interrupt-related data structures from attack and/or corruption by nefarious or malfunctioning OS instances. As will be appreciated by those skilled in the art, hypervisor management of updates to the interrupt-related data structures is expensive to scale while still providing the necessary hypervisor throughput.

In accordance with at least some of the disclosed embodiments, the escalation paths associated with at least some event sources (e.g., those having the 'adaptive escalate enable' field set in EAT 226) can be adapted with hardware support (e.g., by interrupt controller hardware). As a consequence, security of the interrupt-related data structures is maintained without requiring hypervisor involvement (and its concomitant overhead).

Referring now to FIG. 26, there is depicted a high level logical flowchart of an exemplary process 2600 for adapting an interrupt escalation path with hardware support in accordance with one embodiment. Process 2600 of FIG. 26 begins at block 2602 and then proceeds to block 2604, which illustrates an ISC 224 determining whether or not it has received an MMIO store request on memory I/O bus 210 that requests an update to the 'event path no.' field of a specified event source number in its EAT 226 and, if so, whether the 'adaptive escalate enable' field for the specified event source number is set (e.g., to "1") to enable adaptive escalation for the specified event source number. If ISC 224 determines at block 2604 by reference to EAT 226 that adaptive escalation for the event source number specified in the MMIO store request is not enabled, process 2600 continues to iterate at block 2604. In such cases, adaptation of the escalation path can be handled by an alternative method, for example, by the OS instance 2502 invoking an update of the escalation path in the EAT 226 by the hypervisor, as discussed above with reference to FIG. 25B.

In response to an affirmative determination at block 2604, ISC 240 reads the row in ICT 242 associated with the physical thread number that issued the MMIO store request and the exception target level indicated in the row in EAT 226 associated with the event source number specified in the MMIO store request (block 2606). At block 2608, ISC 224 uses the VP # specified in the row of ICT 242 accessed at block 2606 and the priority accessed from the row in EAT 226 to read the relevant event path information from the row of VPT 244 associated with the specified VP #. Following block 2608, ISC 224 updates the 'event path no.' field in the specified row in EAT 226 with the event path information read from VPT 244 (block 2610). Thus, ISC 224 provides hardware-based support for adaptation of the escalation path without involvement of the hypervisor.

Techniques of adapting an interrupt escalation path are implemented in hardware of a data processing system including a processor core that executes virtual processor threads on physical threads of the processor core. In at least one embodiment, an interrupt controller receives, from a physical thread of the processor core, a request to adapt, in an event assignment data structure, an escalation path for a specified event source, where the escalation path includes a pointer to a first event notification descriptor. The interrupt controller reads an entry for the physical thread in an interrupt context data structure to determine a virtual processor thread running on the physical thread. Based on the virtual processor thread determined from the interrupt context data structure, the interrupt controller accesses an entry in a virtual processor data structure to determine a different second event notification descriptor to which escalations are to be routed. The interrupt controller updates the pointer in the event assignment data structure to identify the second event notification descriptor, such that the interrupt escalation path is adapted.

In the flow charts above, the methods depicted in the figures may be embodied in a computer-readable medium as one or more design files. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system."

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of adapting an interrupt escalation path in a data processing system including a processor core that executes virtual processor threads on physical threads of the processor core, the method comprising:

receiving, from a physical thread of the processor core at an interrupt controller, a request to adapt, in an event assignment data structure, an escalation path for a specified event source, wherein the escalation path includes a pointer to a first event notification descriptor;

reading, by the interrupt controller, an entry for the physical thread in an interrupt context data structure to determine a virtual processor thread running on the physical thread;

based on the virtual processor thread determined from the interrupt context data structure, the interrupt controller accessing an entry in a virtual processor data structure to determine a different second event notification descriptor by which escalations are to be routed; and the interrupt controller updating the pointer in the event assignment data structure to identify the second event notification descriptor, such that the interrupt escalation path is adapted.

2. The method of claim 1, wherein:
the data processing system executes a hypervisor managing multiple operating system instances; and
the updating includes the interrupt controller updating the pointer without involvement by the hypervisor.

3. The method of claim 1, wherein receiving the request includes the interrupt controller receiving a memory-mapped input-output (IO) store request from the processor core via an interconnect of the data processing system.

4. The method of claim 1, wherein the reading includes selecting the entry in the interrupt context data structure based in part on an exception target level specified in the event assignment data structure.

5. The method of claim 1, wherein:
the entry in the virtual processor data structure includes a plurality of event path fields each associated with a respective one of a plurality of priorities;
the step of accessing the entry in the virtual processor data structure includes selecting one of the plurality of event path fields identifying the second event notification descriptor based on a priority read by the interrupt controller from the event assignment data structure.

6. The method of claim 1, wherein the receiving includes receiving the request based on migration of a user-level thread to the virtual processor from another virtual processor, wherein the second event notification descriptor directs event escalations to the virtual processor.

7. A data processing system, comprising:
a processor core that executes virtual processor threads on one or more physical threads of the processor core;
an interrupt controller coupled to the processor core, wherein the interrupt controller is configured to perform:
receiving, from a physical thread of the processor core at an interrupt controller, a request to adapt, in an event assignment data structure, an escalation path for a specified event source, wherein the escalation path includes a pointer to a first event notification descriptor;
reading, by the interrupt controller, an entry for the physical thread in an interrupt context data structure to determine a virtual processor thread running on the physical thread;
based on the virtual processor thread determined from the interrupt context data structure, the interrupt controller accessing an entry in a virtual processor data structure to determine a different second event notification descriptor by which escalations are to be routed; and
the interrupt controller updating the pointer in the event assignment data structure to identify the second event notification descriptor, such that the interrupt escalation path is adapted.

8. The data processing system of claim 7, wherein:
the data processing system executes a hypervisor managing multiple operating system instances; and
the updating includes the interrupt controller updating the pointer without involvement by the hypervisor.

9. The data processing system of claim 7, wherein receiving the request includes the interrupt controller receiving a memory-mapped input-output (IO) store request from the processor core via an interconnect of the data processing system.

10. The data processing system of claim 7, wherein the reading includes selecting the entry in the interrupt context data structure based in part on an exception target level specified in the event assignment data structure.

11. The data processing system of claim 7, wherein:
the entry in the virtual processor data structure includes a plurality of event path fields each associated with a respective one of a plurality of priorities;
accessing the entry in the virtual processor data structure includes selecting one of the plurality of event path fields identifying the second event notification descriptor based on a priority read by the interrupt controller from the event assignment data structure.

12. The data processing system of claim 7, wherein the receiving includes receiving the request based on migration of a user-level thread to the virtual processor from another virtual processor, wherein the second event notification descriptor directs event escalations to the virtual processor.

13. A design structure tangibly embodied in a computer-readable storage device for designing, manufacturing, or testing an integrated circuit, wherein the design structure comprises:
an interrupt controller for a data processing system including a processor core that executes virtual processor threads on one or more physical threads of the processor core, wherein the interrupt controller is configured to perform:
receiving, from a physical thread of the processor core at the interrupt controller, a request to adapt, in an event assignment data structure, an escalation path for a specified event source, wherein the escalation path includes a pointer to a first event notification descriptor;
reading, by the interrupt controller, an entry for the physical thread in an interrupt context data structure to determine a virtual processor thread running on the physical thread;
based on the virtual processor thread determined from the interrupt context data structure, the interrupt controller accessing an entry in a virtual processor data structure to determine a different second event notification descriptor by which escalations are to be routed; and
the interrupt controller updating the pointer in the event assignment data structure to identify the second event notification descriptor, such that the interrupt escalation path is adapted.

14. The design structure of claim 13, wherein:
the data processing system executes a hypervisor managing multiple operating system instances; and
the updating includes the interrupt controller updating the pointer without involvement by the hypervisor.

15. The design structure of claim 13, wherein receiving the request includes the interrupt controller receiving a memory-mapped input-output (IO) store request from the processor core via an interconnect of the data processing system.

16. The design structure of claim 13, wherein the reading includes selecting the entry in the interrupt context data structure based in part on an exception target level specified in the event assignment data structure.

17. The design structure of claim 13, wherein:
the entry in the virtual processor data structure includes a plurality of event path fields each associated with a respective one of a plurality of priorities;
accessing the entry in the virtual processor data structure includes selecting one of the plurality of event path fields identifying the second event notification descriptor based on a priority read by the interrupt controller from the event assignment data structure.

18. The design structure of claim 13, wherein the receiving includes receiving the request based on migration of a user-level thread to the virtual processor from another virtual processor, wherein the second event notification descriptor directs event escalations to the virtual processor.

* * * * *